United States Patent
Chang et al.

(10) Patent No.: US 10,670,940 B2
(45) Date of Patent: Jun. 2, 2020

(54) DISPLAY PANEL AND SENSING DISPLAY PANEL

(71) Applicants: Industrial Technology Research Institute, Hsinchu (TW); Intellectual Property Innovation Corporation, Hsinchu (TW)

(72) Inventors: Chih-Chia Chang, Hsinchu County (TW); Yi-Hsiang Huang, Changhua County (TW); Kai-Ming Chang, New Taipei (TW); Kuan-Ting Chen, Yunlin County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 11 days.

(21) Appl. No.: 15/796,867

(22) Filed: Oct. 30, 2017

(65) Prior Publication Data
US 2018/0149944 A1    May 31, 2018

Related U.S. Application Data

(60) Provisional application No. 62/427,820, filed on Nov. 30, 2016.

(30) Foreign Application Priority Data

Nov. 30, 2016    (TW) .............................. 106126809 A

(51) Int. Cl.
*G02F 1/23*    (2006.01)
*G06F 3/042*    (2006.01)
(Continued)

(52) U.S. Cl.
CPC ............ *G02F 1/23* (2013.01); *G02F 1/13338* (2013.01); *G02F 1/133555* (2013.01);
(Continued)

(58) Field of Classification Search
None
See application file for complete search history.

(56) References Cited

U.S. PATENT DOCUMENTS 7,573,191 B2 * 8/2009 Kobayashi .......... H01L 27/3211
313/501
8,253,692 B2    8/2012 Lai
(Continued)

FOREIGN PATENT DOCUMENTS

CN    1690797    11/2005
CN    1705417    12/2005
(Continued)

OTHER PUBLICATIONS

"Fabry—Pérot interferometer," WIKIPEDIA pages, Retrieved on Nov. 7, 2017, available at https://en.wikipedia.org/wiki/Fabry%E2%80%93P%C3%A9rot_interferometer; https://zh.wikipedia.org/wiki/%E6%B3%95%E5%B8%83%E9%87%8C%EF%BC%8D%E7%8F%80%E7%BD%97%E5%B9%B2%E6%B6%89%E4%BB%AA.
(Continued)

*Primary Examiner* — Kenneth B Lee, Jr.
(74) *Attorney, Agent, or Firm* — JCIPRNET

(57) ABSTRACT

A display panel including a substrate, a display device, a dielectric layer, and an optical resonance structure is provided. The substrate has a layout area and a light transmitting area located outside the layout area. The display device is disposed on the layout area of the substrate. The display device includes a first display electrode, a second display electrode, and a display media layer deposited between the first display electrode and the second display electrode. The
(Continued)

dielectric layer is disposed on the substrate and covers the display device. The optical resonance structure is disposed on the dielectric layer and distributed correspondingly to the display device. The optical resonance structure includes a first transflective layer and a second transflective layer stacked on the display device and separated from each other.

19 Claims, 22 Drawing Sheets

(51) Int. Cl.
*G02F 1/1333* (2006.01)
*G02F 1/1335* (2006.01)
*G06F 3/041* (2006.01)
*G06F 3/044* (2006.01)

(52) U.S. Cl.
CPC .............. *G06F 3/042* (2013.01); *G06F 3/044* (2013.01); *G06F 3/0412* (2013.01); *G02F 1/133514* (2013.01); *G06F 2203/04103* (2013.01); *G06F 2203/04111* (2013.01)

(56) References Cited

U.S. PATENT DOCUMENTS

| | | | |
|---|---|---|---|
| 9,075,172 | B2 | 7/2015 | Koh et al. |
| 9,367,162 | B2 | 6/2016 | Lee |
| 9,551,913 | B2 | 1/2017 | Kim et al. |
| 9,595,573 | B2 | 3/2017 | Adachi et al. |
| 9,620,740 | B2 | 4/2017 | Yamae et al. |
| 2005/0243023 | A1 | 11/2005 | Reddy et al. |
| 2007/0269917 | A1 | 11/2007 | Hubert et al. |
| 2014/0119052 | A1 | 5/2014 | Hayama |
| 2014/0139493 | A1 | 5/2014 | King et al. |
| 2015/0370124 | A1* | 12/2015 | Han .................. G02F 1/133514 349/12 |
| 2016/0042702 | A1 | 2/2016 | Hirakata et al. |
| 2016/0172627 | A1 | 6/2016 | Park et al. |
| 2016/0205213 | A1 | 7/2016 | Kolam et al. |
| 2016/0320644 | A1* | 11/2016 | Kim ..................... G02F 1/1334 |

FOREIGN PATENT DOCUMENTS

| | | |
|---|---|---|
| CN | 1823430 | 8/2006 |
| CN | 102033646 | 4/2011 |
| CN | 102667550 | 9/2012 |
| CN | 104750285 | 7/2015 |
| CN | 105319641 | 2/2016 |
| CN | 105759336 | 7/2016 |
| CN | 106033765 | 10/2016 |
| CN | 106094315 | 11/2016 |
| JP | 2007232882 | 9/2007 |
| TW | 200709472 | 3/2007 |
| TW | 201129833 | 9/2011 |
| TW | 201317856 | 5/2013 |
| TW | M500997 | 5/2015 |
| TW | M508682 | 9/2015 |
| TW | 201604602 | 2/2016 |
| TW | 201610961 | 3/2016 |
| WO | 2016162778 | 10/2016 |

OTHER PUBLICATIONS

Chen, Jin-Xin, et al., "White Light OLED Illumination," Publisher: Wu-nan, ISBN: 9789571157924, Chapter 9: Optics and Outcoupling of Organic Light Emitting Device, 9.2.1 Fabry—Perot Resonance Cavity Theory, Publication date: Oct. 21, 2009, pp. 232-233, with English translation thereof.

"Office Action of Taiwan Related Application, application No. 106135576", dated Dec. 20, 2017, p. 1-p. 9, in which the listed references were cited.

"Office Action of Taiwan Counterpart Application," dated Jun. 19, 2018, pp. 1-6.

"Office Action of China Counterpart Application," dated Aug. 1, 2019, pp. 1-11.

"Office Action of China Related Application No. 201711169302.1", dated Mar. 8, 2019, pp. 1-6.

"Office Action of China Counterpart Application", dated Jan. 16, 2020, p. 1-p. 11.

* cited by examiner

DISPLAY PANEL AND SENSING DISPLAY PANEL

CROSS-REFERENCE TO RELATED APPLICATION

This application claims the priority benefits of U.S. provisional application Ser. No. 62/427,820, filed on Nov. 30, 2016, and Taiwan application serial no. 106126809, filed on Aug. 9, 2017. The entirety of each of the above-mentioned patent applications is hereby incorporated by reference herein.

TECHNICAL FIELD

The disclosure relates to a display panel and a sensing display panel.

BACKGROUND

For the color performance of a display panel, the color saturation of the display panel is usually measured with the standard set by the National Television System Committee (NTSC). In general, in order to improve the color saturation of display panel, a color filter layer with high color saturation may be used in the display panel in current technologies. However, the color filter layer with high color saturation has a pretty low light transmittance. The emission luminance of the display panel could be maintained by increasing the driving power of display device. To improve the color saturation of display panel, there may be a problem of increasing power consumption.

In addition, a display device is often integrated with a sensing device to form a sensing display panel, but the sensing display panel with the sensing device may have a lower aperture ratio or light transmittance. It is one of important issues on how to improve the color saturation as well as the aperture ratio or the light transmittance of a display panel or a sensing display panel.

SUMMARY

A display panel according to an embodiment of the present disclosure includes a substrate, a display device, a dielectric layer, and an optical resonance structure. The substrate has a layout area and a light transmitting area located outside the layout area. The display device is disposed on the layout area of the substrate. The display device includes a first display electrode, a second display electrode, and a display media layer deposited between the first display electrode and the second display electrode. The dielectric layer is deposited on the substrate and covers the display device. The optical resonance structure is disposed on the dielectric layer and distributed correspondingly to the display device. The optical resonance structure includes a first transflective layer and a second transflective layer stacked on the display device and separated from each other.

A sensing display panel according to another embodiment of the present disclosure includes a substrate, a display device, a dielectric layer, and a sensing device. The substrate has a layout area and a light transmitting area located outside the layout area. The display device is disposed on the layout area of the substrate. The display device includes a first display electrode, a second display electrode, and a display media layer located between the first display electrode and the second display electrode. The dielectric layer is located on the substrate and covers the display device. The sensing device is disposed on the layout area of the substrate and covers the dielectric layer. The sensing device includes a first sensing circuit, a second sensing circuit, and an insulating layer located between the first sensing circuit and the second sensing circuit, wherein the first sensing circuit and the second sensing circuit include a transflective electrode, and the first sensing circuit and the second sensing circuit are stacked on the display device to form an optical resonance structure.

A sensing display panel according to yet another embodiment of the present disclosure includes a substrate, a display device, a dielectric layer, and a sensing device. The substrate has a layout area and a light transmitting area located outside the layout area. The display device is disposed on the layout area of the substrate. The display device includes a first display electrode, a second display electrode, and a display media layer located between the first display electrode and the second display electrode. The dielectric layer is located on the substrate and covers the display device. The sensing device is disposed on the layout area of the substrate and covers the dielectric layer. The sensing device includes a first sensing circuit and a second sensing circuit, wherein the first sensing circuit includes a transflective electrode, and the first sensing circuit includes a first sensing portion and a second sensing portion that are stacked on the display device to form an optical resonance structure.

Several exemplary embodiments accompanied with figures are described in detail below to further describe the disclosure in details.

DETAILED DESCRIPTION OF DISCLOSED EMBODIMENTS

Figure 1A:
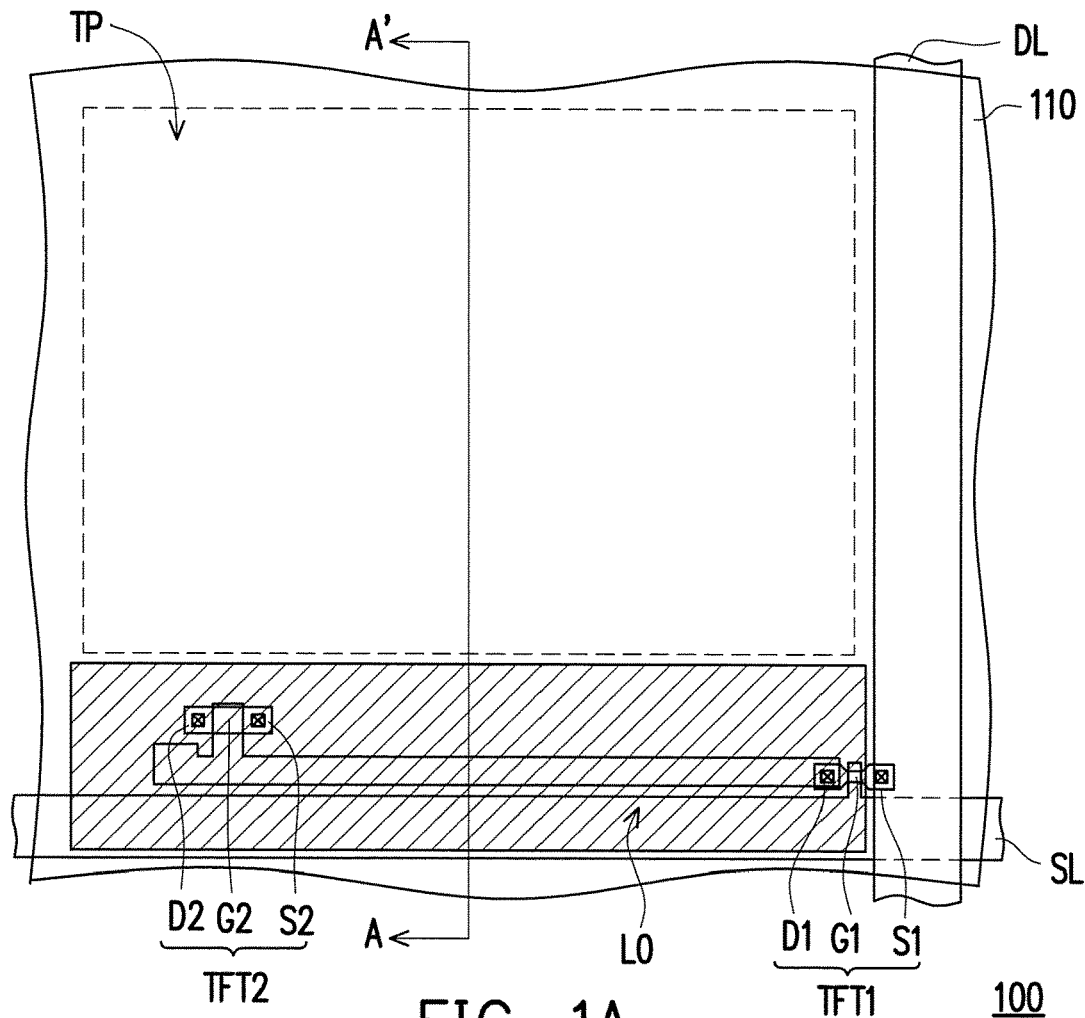
FIG. 1A is a schematic top view illustrating a display panel according to a first embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1B:
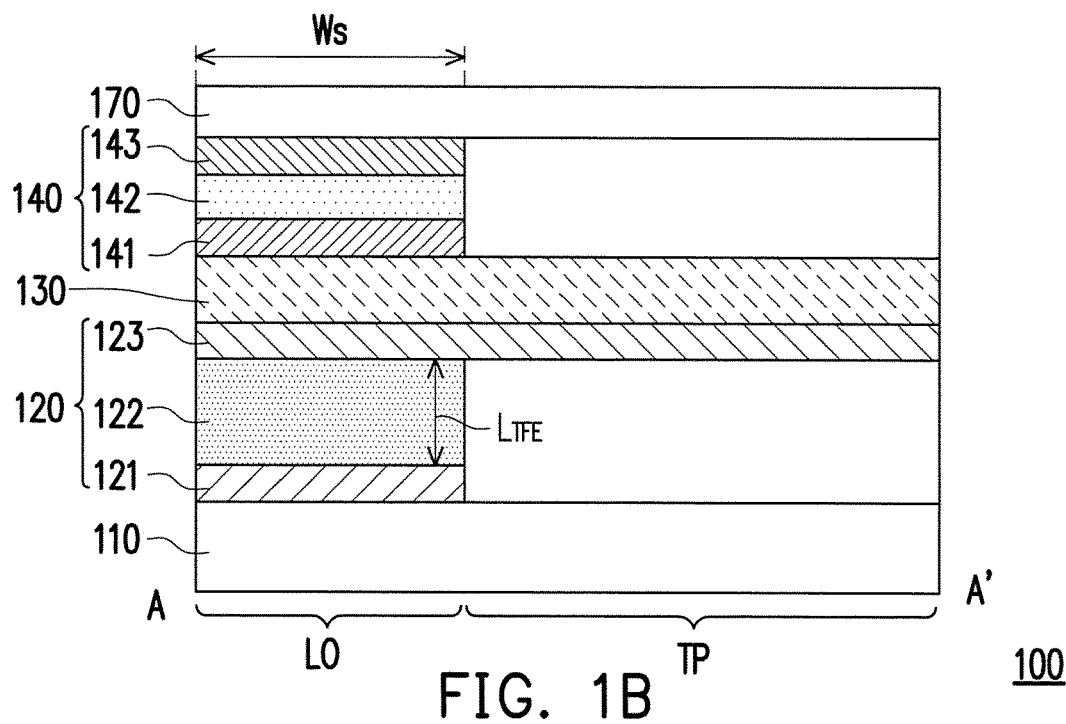
FIG. 1B is a schematic cross-sectional view of FIG. 1A along a section line AA'.

FIG. 1A is a schematic top view illustrating a display panel according to a first embodiment of the disclosure. FIG. 1B is a schematic cross-sectional view of FIG. 1A along section line AA'. FIG. 1A shows only a first display electrode 121 disposed on a layout area LO of a substrate 110 and a first active device TFT1, a second active device TFT2, a scan line SL, and a data line DL located under the first display electrode 121 for clarity of illustration, and FIG. 1B omits drawings of some of the layers or the devices. Referring to FIGS. 1A and 1B, a display panel 100 of this embodiment may include a substrate 110, a display device 120, a dielectric layer 130, and an optical resonance structure 140. The substrate 110 has a layout area LO and a light transmitting area TP located outside the layout area LO. The display device 120 is disposed on the layout area LO of the substrate 110. The dielectric layer 130 is located on the substrate 110 and covers the display device 120. The optical resonance structure 140 is disposed on the dielectric layer 130 and distributed correspondingly to the display device 120.

In the embodiment, the first active device TFT1, the second active device TFT2, the scan line SL, the data line DL, and/or the like may be located on the layout area LO of the substrate 110, and an area of the light transmitting area TP may be larger than an area of the layout area LO for enhancing a light transmittance of the display panel 100, but the scope of the disclosure is not limited thereto.

The substrate 110 may be a rigid or flexible substrate with transmittance of visible light. For example, materials of the rigid substrate may include glass or other rigid materials, and materials of the flexible substrate may include polyethylene terephthalate (PET), polyimide (PI), polycarbonate (PC), polyamide (PA), polyethylene naphthalate (PEN), polyethylenimine (PEI), polyurethane (PU), polydimethylsiloxane (PDMS), an acrylic-based polymer (for example, polymethylmethacrylate, PMMA), an ether-based polymer (for example, polyethersulfone, PES or polyetheretherketone, PEEK), polyolefin, metal foil, thin glass, or other flexible materials. However, the scope of the disclosure is not limited thereto.

In other embodiments, the substrate 110 may be a carrier that includes conductive lines and/or other electronic devices (for example, active device, passive device, sensing device, communication device, logic operating device, or Micro Electro Mechanical Systems (MEMs)). For instance, there may be a plurality of active devices TFT1, a plurality of scan lines SL, and a plurality of data lines DL on the layout area LO of the substrate 110. The scan line SL and the data line DL cross each other to define the region where each sub-pixel (not shown) is located, and the sub-pixels are arranged in an array to form a pixel array (not shown). Each of the sub-pixels may include a display device 120 and one set of active devices TFT1 and TFT2. It is to be noted that, in FIG. 1A, only one set of active devices TFT1 and TFT2, one scan line SL, and one date line DL are shown. It will be appreciated by those skilled in the art that the number of the active devices TFT1 and TFT2, scan line SL, data line DL may be adjusted in accordance with the actual design requirements.

The first active device TFT1 includes a first channel layer (not shown), a first gate electrode G1, a first source electrode S1, and a first drain electrode D1. The second active device TFT2 includes a second channel layer (not shown), a second gate electrode G2, a second source electrode S2, and a second drain electrode D2.

The display device 120 includes a first display electrode 121, a second display electrode 123, and a display media layer 122 located between the first display electrode 121 and the second display electrode 123.

The first source electrode S1 is electrically connected to the corresponding data line DL. The first gate electrode G1 is electrically connected to the corresponding scan line SL. That is, the first active device TFT1 of each sub-pixel is driven by the electrical signal transmitted by one of the corresponding scan line SL and one of the corresponding data line DL.

The first drain electrode D1 is electrically connected to the second gate electrode G2. The second source electrode S2 is electrically connected to a voltage source (VDD, nor shown). The second drain electrode D2 is electrically connected to the first display electrode 121 of the display device 120 to drive the display media layer 122 with the second display electrode 123 of each sub-pixel. In the embodiment, the second display electrode 123 may be a common electrode that is entirely distributed on the substrate 110, and may be grounded or electrically connected to a common voltage (Vcom), but the scope of the disclosure is not limited thereto.

In one embodiment, materials of the first display electrode 121 and the second display electrode 123 may include indium tin oxide (ITO), indium zinc oxide (IZO), Al doped zinc oxide (AZO), Ga doped zinc oxide (GZO), Zinc-Tin Oxide (ZTO), fluorine-doped tin oxide (FTO), $In_2O_3$, ZnO, $SnO_2$, $TiO_2$, organic conductive polymer (for example, PEDOT:PSS), carbon nanotube (CNTs), metal (for example, Silver nanowire), or other light transmitting conductive materials; or the first display electrode 121 and the second display electrode 123 may comprise at least one light transmitting electrode, but the scope of the disclosure is not limited thereto. In other embodiments, the first display electrode 121 or the second display electrode 123 may be a conductive material such as a metal or a metal oxide. If both of the first display electrode 121 and the second display electrode 123 are made of a light transmitting conductive material, the fabricated display panel 100 may constitute a double-sided light-emitting display device. If one of the first display electrode 121 and the second display electrode 123 is made of a light transmitting conductive material, the fabricated display panel 100 may constitute a bottom light-emitting type or top light-emitting type display device.

In an embodiment, the dielectric layer 130 may be made of inorganic materials. The inorganic materials may include SiOx, SiNx, SiON, AlOx, AlON, or other similar materials. In other embodiments, the dielectric layer 130 may be made of organic materials. The organic materials may include polyimide (PI), polycarbonate (PC), polyamide (PA), polyethylene terephthalate (PET), polyethylene naphthalate (PEN), polyethylenimine (PEI), polyurethane (PU), polydimethylsiloxane (PDMS), an acrylic-based polymer (for example, polymethylmethacrylate, PMMA), an ether-based polymer (for example, polyethersulfone, PES or polyetheretherketone, PEEK), polyolefin, photoresist, other similar materials, or a combination thereof. In other possible embodiments, the dielectric layer 130 may be formed by alternately stacking organic and inorganic layers, or formed by a hybrid material of organic and inorganic materials. The dielectric layer 130 is formed between the display device 120 and the optical resonance structure 140, which may be used to separate the display device 120 from the optical resonance structure 140.

The optical resonance structure 140 includes a first transflective layer 141 and a second transflective layer 143 stacked on the display device 120 and separated from each other. A light transmitting layer 142 is located between the first transflective layer 141 and the second transflective layer 143, and the opposite ends of the light transmitting layer 142 are in contact with the first transflective layer 141 and the second transflective layer 143, respectively. The first transflective layer 141 and the second transflective layer 143 are transflective films. The light transmitting layer 142 may be a transparent insulating layer similar to the dielectric layer 130, or may be a transparent conductive layer similar to the first display electrode 121 or the second display electrode 123, but the scope of the disclosure is not limited thereto. The first transflective layer 141 and the second transflective layer 143 are separated from each other and have a pitch to form an optical resonance structure 140 having an optical micro-cavity property, so that the coherence of light emitted by the display device 120 may be enhanced.

In this embodiment, a material of the first transflective layer 141 and the second transflective layer 143 includes a magnesium-silver alloy, for example, so that the first transflective layer 141 and the second transflective layer 143 are transflective electrodes having conductive and transflective properties. However, the scope of the disclosure is not limited thereto. In other embodiment, the first transflective layer 141 and the second transflective layer 143 may be transflective films composed of insulating films stacked on top of each other. If the first transflective layer 141 and/or the second transflective layer 143 are made of a conductive material, the first transflective layer 141 and/or the second transflective layer 143 may be a part of other electronic devices (for example, active device, passive device, sensing device, communication device, logic operating device, or MEMs systems).

Generally, the thickness of the first transflective layer 141 and the thickness of the second transflective layer 143 may be adjusted according to their materials, so the first transflective layer 141 and the second transflective layer 143 may have better transflective property. Take the first transflective layer 141 and the second transflective layer 143 having the magnesium-silver alloy material as an example, the thickness of the first transflective layer 141 and the thickness of the second transflective layer 143 respectively range about from 5 nm to 10 nm in which the light emitted by the display device 120 is visible. However, the scope of the disclosure is not limited thereto.

In addition, a size (for example, length or width) and the relative position between of the display device 120 and the optical resonance structure 140 need to have a corresponding relationship, to have the color saturation of light emitted by the display device 120 being enhanced through the corresponding optical resonance structure 140. For instance, in the embodiment, the optical resonance structure 140 has a first width Ws, the dielectric layer 130 has a first thickness $L_{TFE}$ and a first refractive index $n_{TFE}$. After the light emits from the optical resonance structure 140, an emergent medium (for example, a hard coat layer 170 described later) being passed through has a second refractive index $n_{out}$. The relationship between the first width Ws, the first thickness $L_{TFE}$, a first refractive index $n_{TFE}$, and the second refractive index $n_{out}$ may be expressed by the equation (1):

$$Ws \geq 2 \times L_{TFE} \times \sin^{-1}\left(\frac{n_{out}}{n_{TFE}}\right) \quad (1)$$

This embodiment may enhance the color saturation of the display panel 100 through the optical resonance structure 140 disposed on the dielectric layer 130 and corresponding to the distribution of the display device 120.

In general, a hard coat layer 170 may be disposed on the display device 120 to avoid damage or collision of the display device 120, the optical resonance structure 140, and/or other films located under the hard coat layer 170. The hard coat layer 170 may be made of an organic material and/or an inorganic material, a refractive index of the organic material may be, for example, between 1.4 and 1.8, and a refractive index of the inorganic material may be, for example, between 1.3 and 2.2. However, the scope of the disclosure is not limited thereto.

Figure 2:
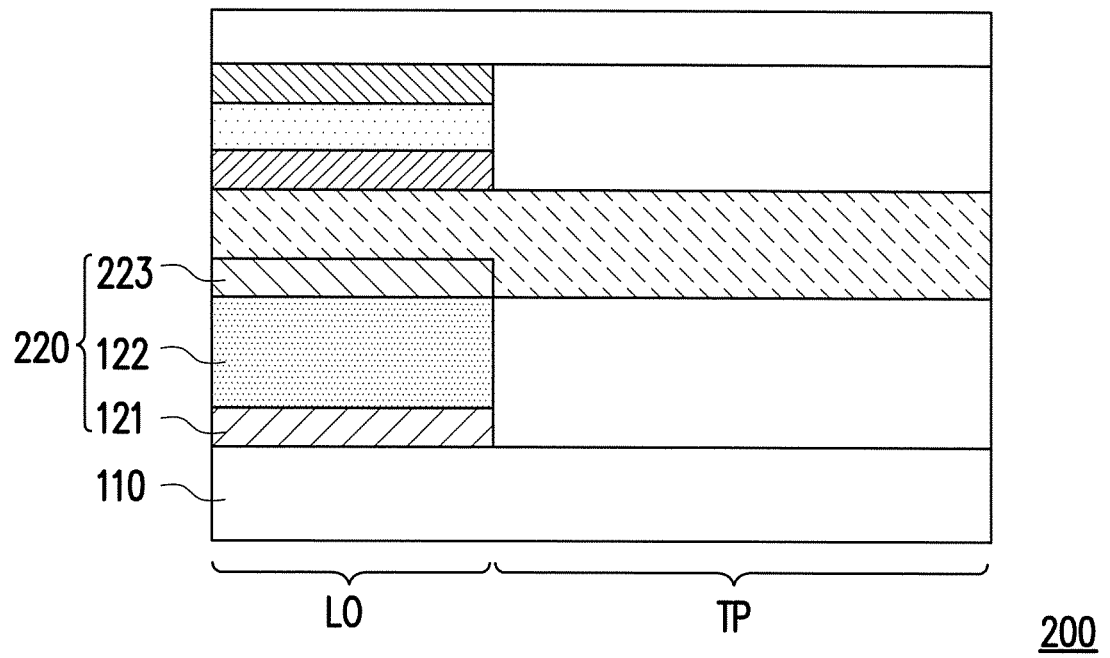
FIG. 2 is a schematic cross-sectional view illustrating a display panel according to a second embodiment of the disclosure.

FIG. 2 is a schematic cross-sectional view illustrating a display panel according to a second embodiment of the disclosure. A display panel 200 of the second embodiment is similar to the display panel 100 of the first embodiment. This second embodiment is described with referring to FIG. 2 for the display panel 200. It is to be noted that, in FIG. 2, like or similar reference numerals represent like or similar components. Thus, components already described in FIG. 1 will not be described in the following.

Referring to FIG. 2, a second display electrode 223 of a display device 220 is disposed on the layout area LO of the substrate 110. In other words, the second display electrode 223 is disposed away from the light transmitting area TP of the substrate 110.

Figure 3:
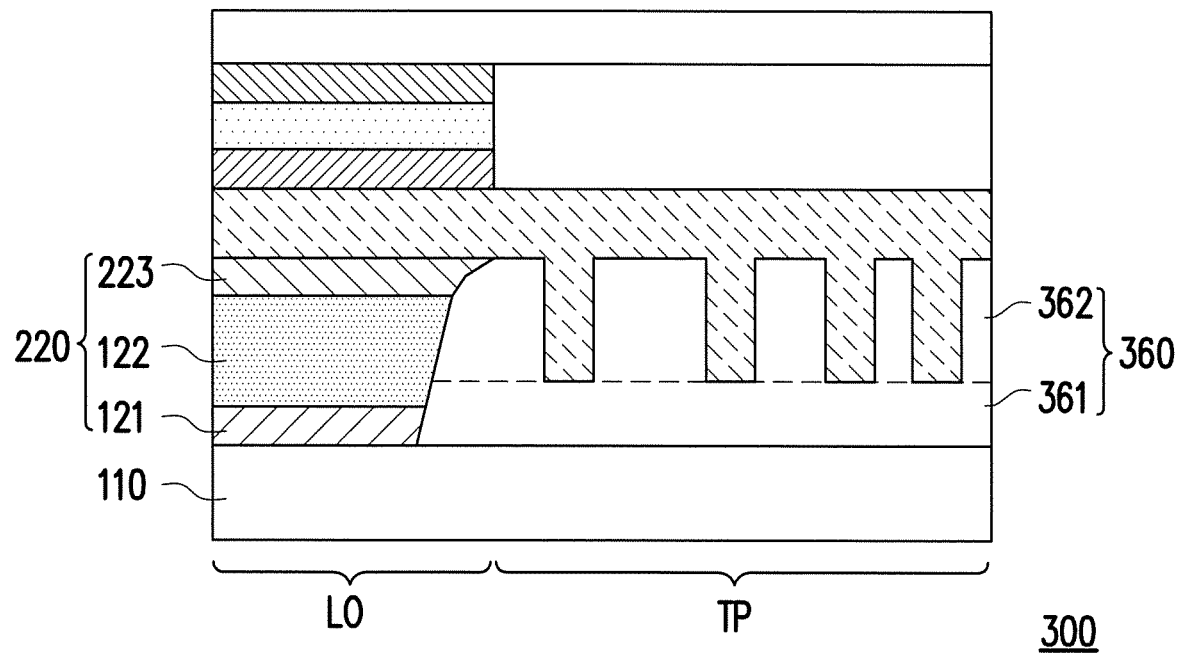
FIG. 3 is a schematic cross-sectional view illustrating a display panel according to a third embodiment of the disclosure.

FIG. 3 is a schematic cross-sectional view illustrating a display panel according to a third embodiment of the disclosure. A display panel 300 of the third embodiment is similar to the display panel 200 of the second embodiment. This third embodiment is described with referring to FIG. 3 for the display panel 300. It is to be noted that, in FIG. 3, like or similar reference numerals represent like or similar components. Thus, components already described in FIG. 2 will not be described in the following.

Referring to FIG. 3, the display panel 300 further includes a light guide structure 360 disposed on the light transmitting area TP of the substrate 110. The light guide structure 360 may be composed of an optical film 361 and a plurality of optical microstructures 362, wherein the optical film 361 is a diffusion film, for example. The optical microstructures 362 are disposed on the optical film 361. In some embodiments, a distribution density of the plurality of optical microstructures 362 is gradually increased from one side adjacent to the display device 220 to one side away from the display device 220. Thus, the brightness difference between the dark area and the bright area may be reduced, and the light emitted by the display device 220 may be uniformly derived, thereby increasing the luminance in the forward direction of the display panel 300 in an effective illumination area.

Figure 4A:
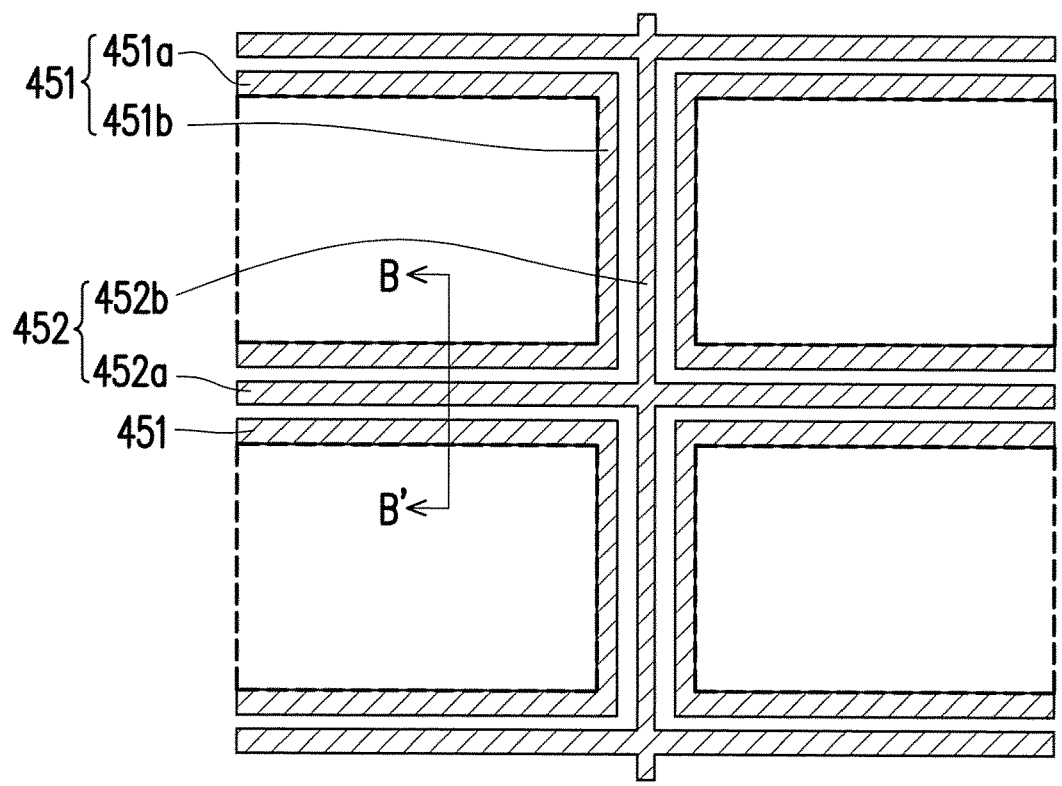
FIG. 4A is a schematic top view illustrating a display panel according to a fourth embodiment of the disclosure.
Figure 4B:
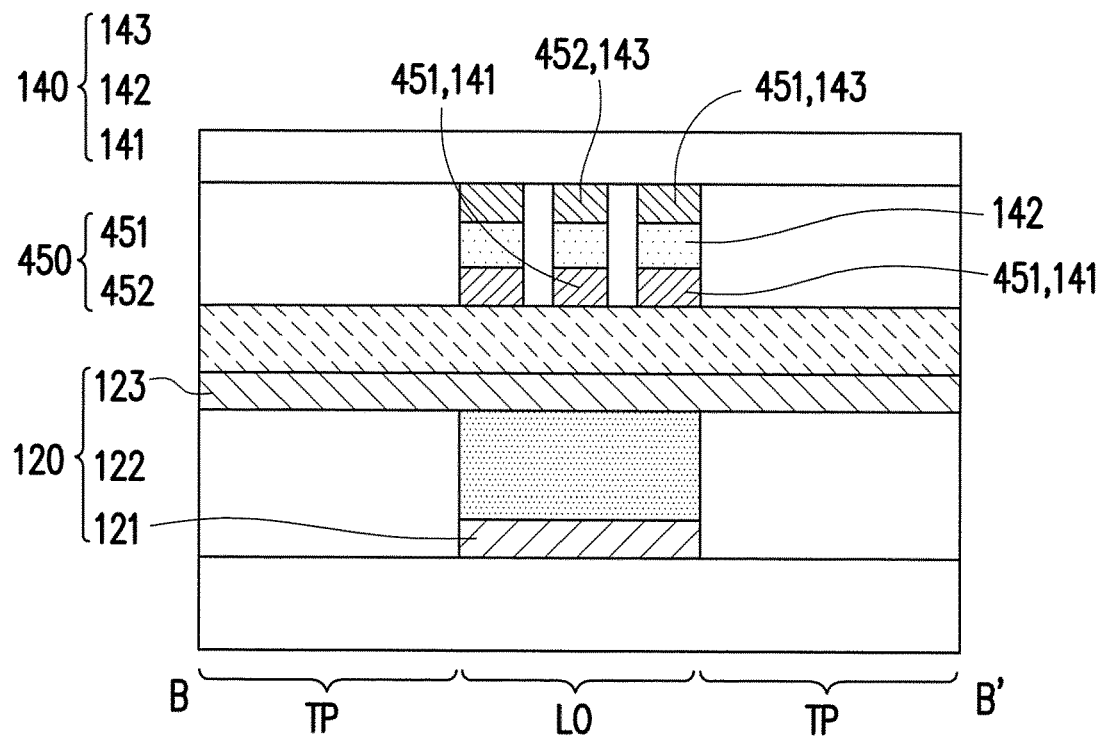
FIG. 4B is a schematic cross-sectional view of FIG. 4A along a section line BB'.

FIG. 4A is a schematic top view illustrating a sensing display panel according to a fourth embodiment of the disclosure. FIG. 4B is a schematic cross-sectional view of FIG. 4A along a section line BB'. FIG. 4A omits drawings of some of the layers for clarity. A sensing display panel 400 of the fourth embodiment is similar to the display panel 100 of the first embodiment. This fourth embodiment is described with referring to FIGS. 4A and 4B for the sensing display panel 400. It is to be noted that, in FIGS. 4A and 4B, like or similar reference numerals represent like or similar components. Thus, components already described in FIG. 1 will not be described in the following.

Referring to FIGS. 4A and 4B, the sensing display panel 400 includes a sensing device 450 and has an optical resonant structure 140 corresponding to the distribution of the display device 120.

The sensing device 450 is configured to detect a signal which is generated when the user touches the sensing display panel 400. Such the signal may be a change of capacitance, a change of voltage, or the like. Taking capacitive sensing as an example, when the user touches the sensing display panel 400, the sensing device 450 may generate a change of capacitance in a region where it is touched. The change of capacitance may be detected and identified by a controller (not shown) connected to a first sensing circuit 451 and/or a second sensing circuit 452. Taking piezo sensing as an example, when the user touches the sensing display panel 400, the sensing device 450 may has a corresponding deformation and generate a change of voltage in a region where it is touched. The change of voltage may be detected and identified by a controller (not shown) connected to a first sensing circuit 451 and/or a second sensing circuit 452.

In this embodiment, the sensing device 450 includes a first sensing circuit 451 and a second sensing circuit 452 electrically insulated from each other, wherein the first sensing circuit 451 and/or the second sensing circuit 452 may be formed by the first transflective layer 141 and the second transflective layer 143 of the optical resonance structure 140. In other words, the first sensing circuit 451 and/or the second sensing circuit 452 may include a first sensing portion and a second portion to form the optical resonance structure 140, and be stacked on the display device 120, wherein the first sensing portion is the first transflective layer 141 of the optical resonance structure 140, the second sensing portion is the second transflective layer 143 of the optical resonance structure 140. And the first transflective layer 141 and the second transflective layer 143 are transflective electrodes. In some embodiments, the light transmitting layer 142 of the optical resonant structure 140 may be a light transmitting conductive layer, so that the first sensing circuit 451 and/or the second sensing circuit 452 formed by the first transflective layer 141 and the second transflective layer 143 may have better conductivity.

In the embodiment, the first sensing circuit 451 is, for example, a plurality of first sensing electrodes 451a having the same extending direction, and a plurality of second sensing electrodes 451b having the same extending direction, wherein the extending direction of the first sensing electrodes 451a may be substantially perpendicular to the extending direction of the second sensing electrodes 451b. The second sensing circuit 452 is, for example, a plurality of third sensing electrodes 452a having the same extending direction and a plurality of fourth sensing electrodes 452b having the same extending direction, wherein the extending direction of the third sensing electrode 452a may be substantially perpendicular to the extending direction of the fourth sensing electrode 452b. The extending direction of the first sensing electrode 451a may be substantially parallel to the extending direction of the third sensing electrode 452a. The extending direction of the second sensing electrode 451b may be substantially parallel to the extending direction of the fourth sensing electrode 452b.

There may be a plurality of first sensing electrodes 451a and/or a plurality of second sensing electrodes 451b between two adjacent light transmitting areas TP. The third sensing electrode 452a may be located between two adjacent first sensing electrodes 451a. The fourth sensing electrode 452b may be located between two adjacent second sensing electrodes 451b, and the aforesaid second sensing electrode 451b and the fourth sensing electrode 452b may correspond to the same layout area LO. However, the scope of the disclosure does not limit on the circuit layout of the first sensing circuit 451 and/or the second sensing circuit 452.

Figure 5A:
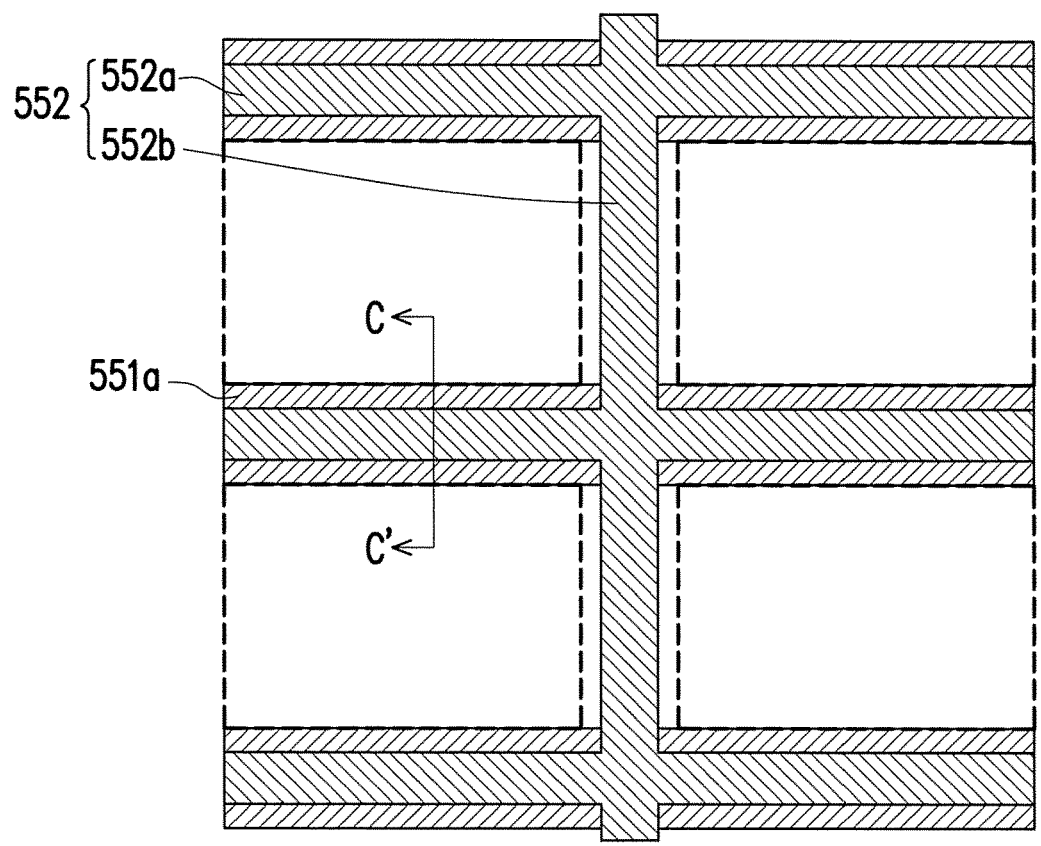
FIG. 5A is a schematic top view illustrating a display panel according to a fifth embodiment of the disclosure.
Figure 5B:
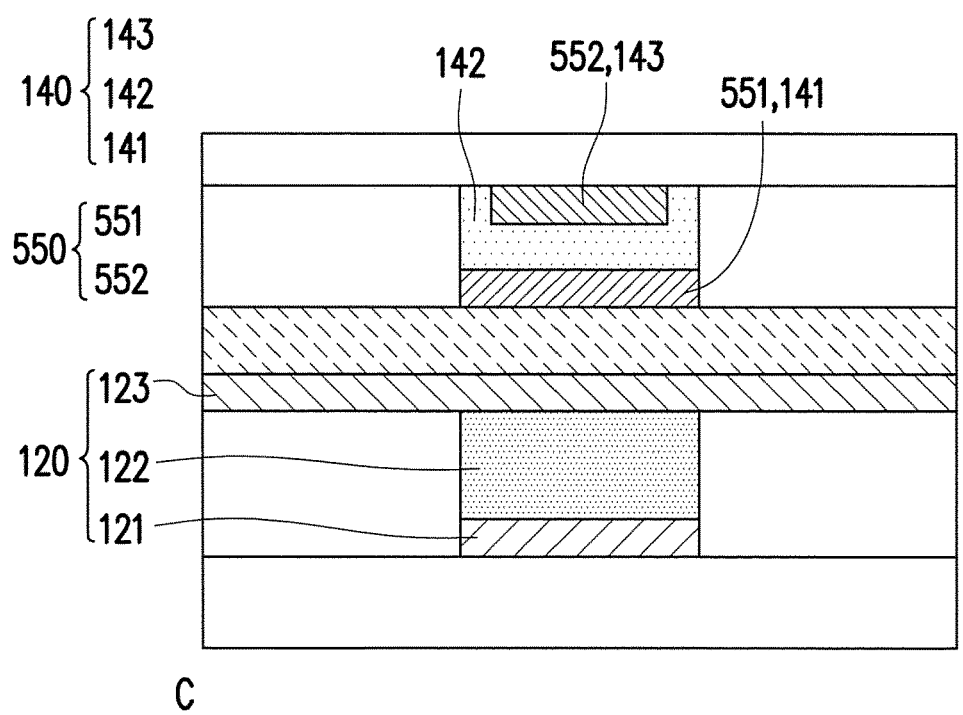
FIG. 5B is a schematic cross-sectional view of FIG. 5A along a section line CC'.

FIG. 5A is a schematic top view illustrating a sensing display panel according to a fifth embodiment of the disclosure. FIG. 5B is a schematic cross-sectional view of FIG. 5A along a section line CC'. FIG. 5A omits drawings of some of the layers for clarity. A sensing display panel 500 of the fifth embodiment is similar to the display panel 100 of the first embodiment. This fifth embodiment is described with referring to FIGS. 5A and 5B for the sensing display panel 500. It is to be noted that, in FIGS. 5A and 5B, like or similar reference numerals represent like or similar components. Thus, components already described in FIG. 1 will not be described in the following.

Referring to FIGS. 5A and 5B, the sensing display panel 500 includes a sensing device 550 and has an optical resonant structure 140 corresponding to the distribution of the display device 120.

In this embodiment, the sensing device 550 includes a first sensing circuit 551 and a second sensing circuit 552 electrically insulated from each other, wherein the first sensing circuit 551 may be formed by the first transflective layer 141 of the optical resonance structure 140, and the second sensing circuit 552 may be formed by the second transflective layer 143 of the optical resonance structure 140. In other words, the first sensing circuit 551 and the second sensing circuit 552 of the sensing device 550 may be stacked on the display device 120 to form the optical resonance structure 140, and the first sensing circuit 551 and the second sensing circuit 552 may include transflective electrodes. In addition, in the embodiment, the light transmitting layer 142 of the optical resonance structure 140 may be a light transmitting insulating layer, so that the first sensing circuit 551 and the second sensing circuit 552 respectively formed by the first transflective layer 141 and the second transflective layer 143 may be electrically insulated from each other.

In this embodiment, the first sensing light transmitting circuit 551 is, for example, a plurality of first sensing electrodes 551a having the same extending direction. The second sensing circuit 552 is, for example, a plurality of third sensing electrodes 552a having the same extending direction and a plurality of fourth sensing electrodes 552b having the same extending direction. The extending direction of the third sensing electrodes 552a may be substantially perpendicular to the extending direction of the fourth sensing electrodes 552b, the extending direction of the first sensing electrodes 551a may be substantially parallel to the extending direction of the third sensing electrodes 552a.

In an embodiment, an area of the, first sensing electrode 551a may be larger than the third sensing electrode 552a to reduce the signal interference of the second display electrode 123 with respect to the third sensing electrode 552a. However, the scope of the disclosure is not limited thereto.

Figure 6:
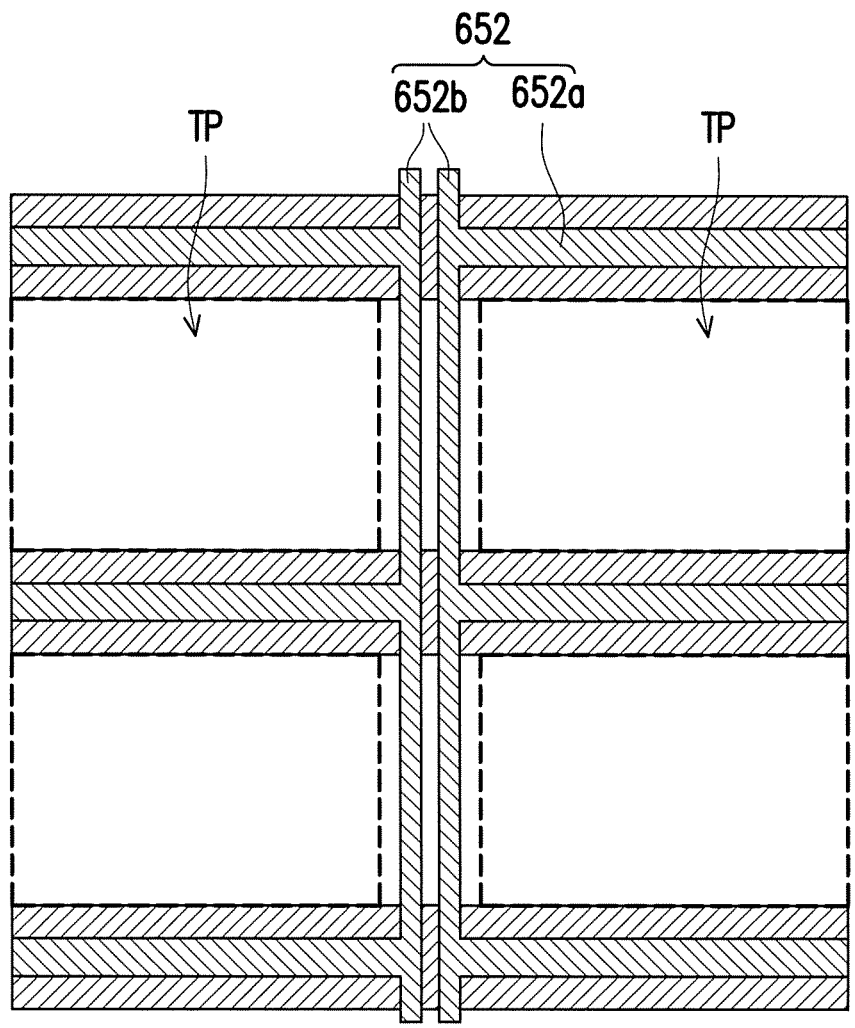
FIG. 6 is a schematic top view illustrating a display panel according to a sixth embodiment of the disclosure.

FIG. 6 is a schematic top view illustrating a sensing display panel according to a sixth embodiment of the disclosure. FIG. 6 omits drawings of some of the layers for clarity. A sensing display panel 600 of the sixth embodiment is similar to the sensing display panel 500 of the fifth embodiment. This sixth embodiment is described with referring to FIG. 6 for the sensing display panel 600. It is to be noted that, in FIG. 6, like or similar reference numerals represent like or similar components. Thus, components already described in FIGS. 5A and 5B will not be described in the following.

Referring to FIG. 6, a second sensing circuit 652 includes, for example, a plurality of third sensing electrodes 652a having the same extending direction and a plurality of fourth sensing electrodes 652b having the same extending direction. The plurality of fourth sensing electrodes 652b may be provided between two adjacent light-transmitting areas TP and separated from each other.

Figure 7:
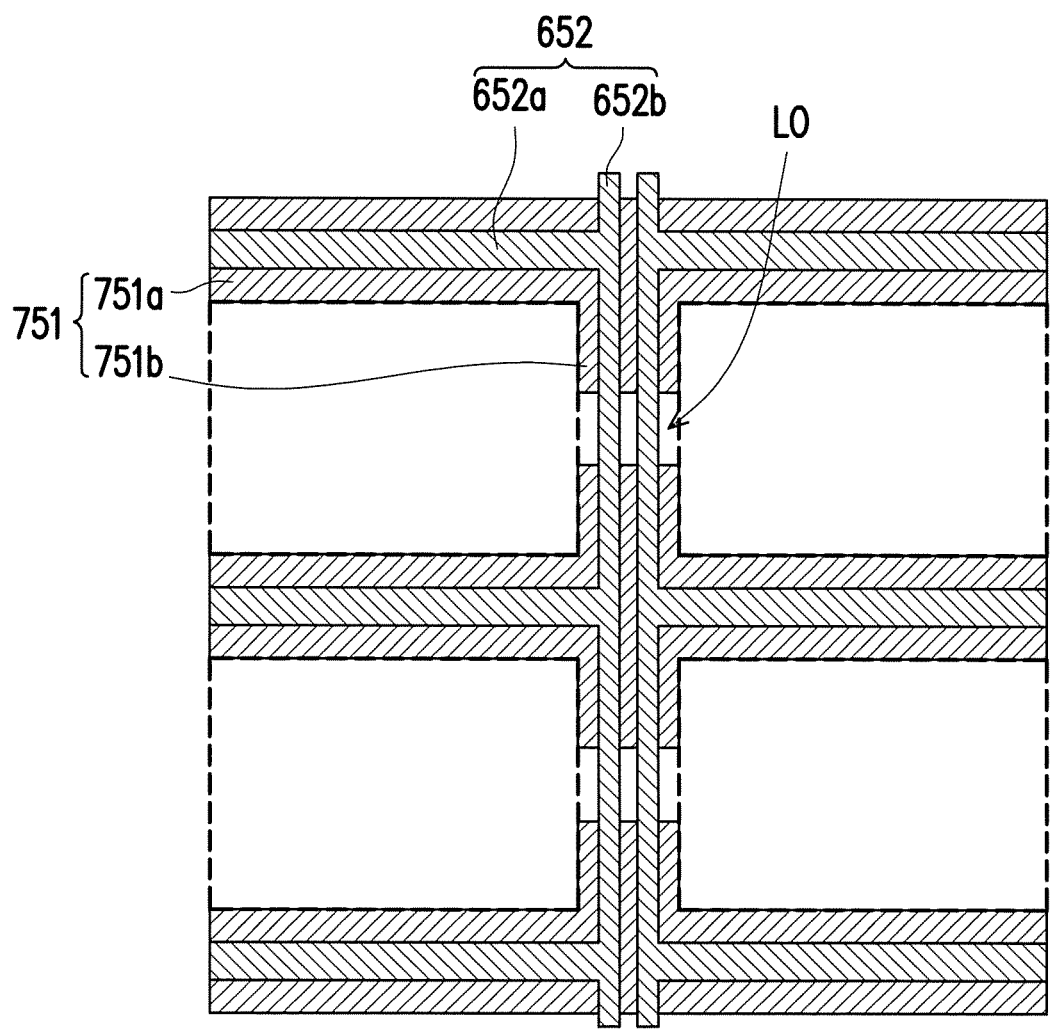
FIG. 7 is a schematic top view illustrating a display panel according to a seventh embodiment of the disclosure.

FIG. 7 is a schematic top view illustrating a sensing display panel according to a seventh embodiment of the disclosure. FIG. 7 omits drawings of some of the layers for clarity. A sensing display panel 700 of the seventh embodiment is similar to the sensing display panel 600 of the sixth embodiment. This seventh embodiment is described with referring to FIG. 7 for the sensing display panel 700. It is to be noted that, in FIG. 7, like or similar reference numerals represent like or similar components. Thus, components already described in FIG. 6 will not be described in the following.

Referring to FIG. 7, a first sensing circuit 751 includes, for example, a plurality of first sensing electrodes 751a having the same extending direction and a plurality of second sensing electrodes 751b having the same extending direction, wherein the extending direction of the first sensing electrode 751a may be substantially perpendicular to the extending direction of the second sensing electrode 751b. The extending direction of the first sensing electrodes 751a may be substantially parallel to the extending direction of the third sensing electrodes 652a, the extending direction of the second sensing electrodes 751b may be substantially parallel to the extending direction of the fourth sensing electrodes 652b. The plurality of second sensing electrodes 751b separated from each other and the plurality of fourth sensing electrodes 652b separated from each other may correspond to the same layout area LO, and the aforementioned second sensing electrodes 751b and the fourth sensing electrodes 652b may overlap each other.

Figure 8:
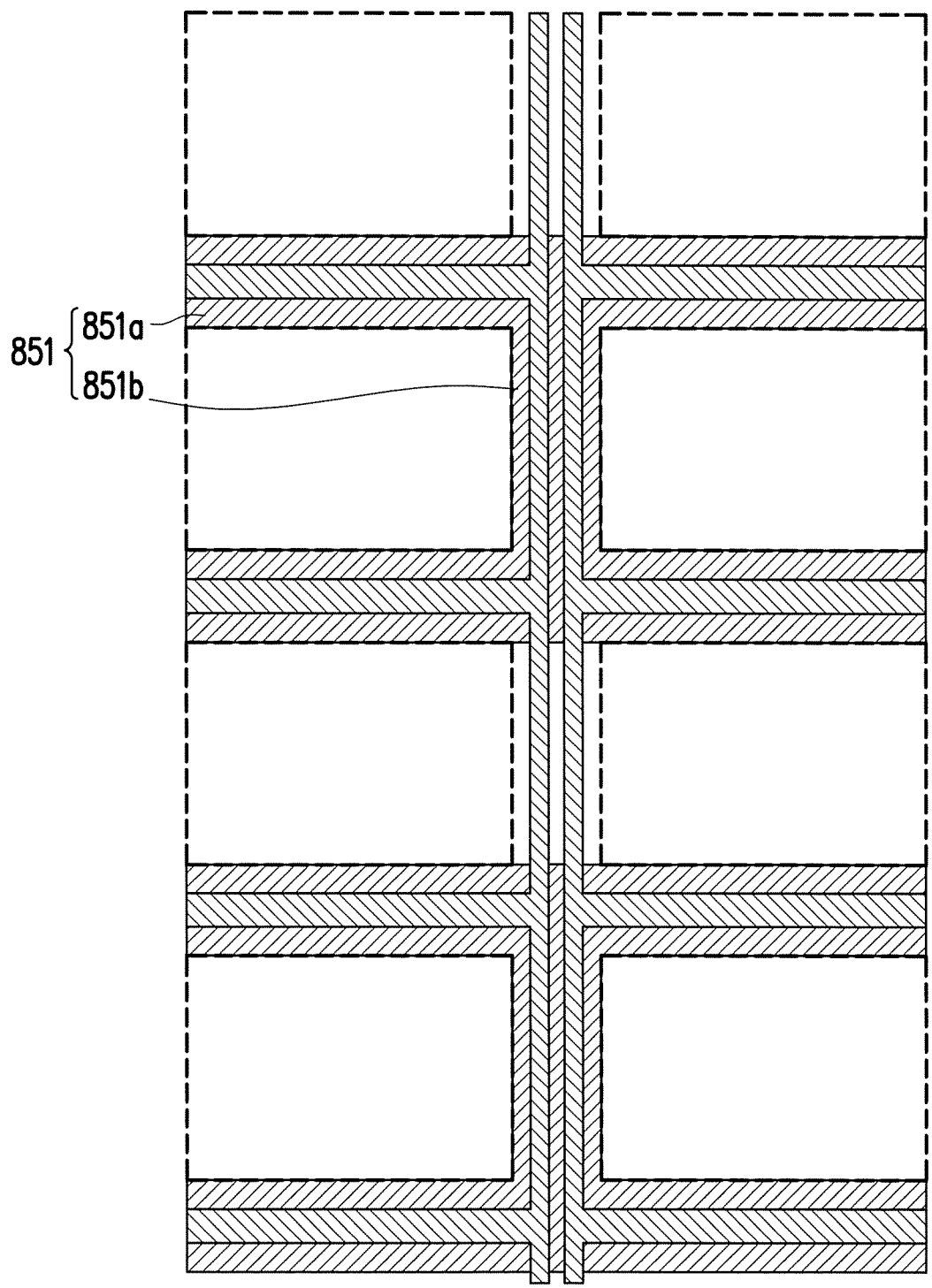
FIG. 8 is a schematic top view illustrating a display panel according to an eighth embodiment of the disclosure.

FIG. 8 is a schematic top view illustrating a sensing display panel according to an eighth embodiment of the disclosure. FIG. 8 omits drawings of some of the layers for clarity. A sensing display panel 800 of the eighth embodiment is similar to the sensing display panel 600 of the sixth embodiment. This eighth embodiment is described with referring to FIG. 8 for the sensing display panel 800. It is to be noted that, in FIG. 8, like or similar reference numerals represent like or similar components. Thus, components already described in FIG. 6 will not be described in the following.

Referring to FIG. 8, in a first sensing circuit 851, a second sensing electrode 851b may be provided between two adjacent first sensing electrodes 851a and connected to each other.

Figure 9:
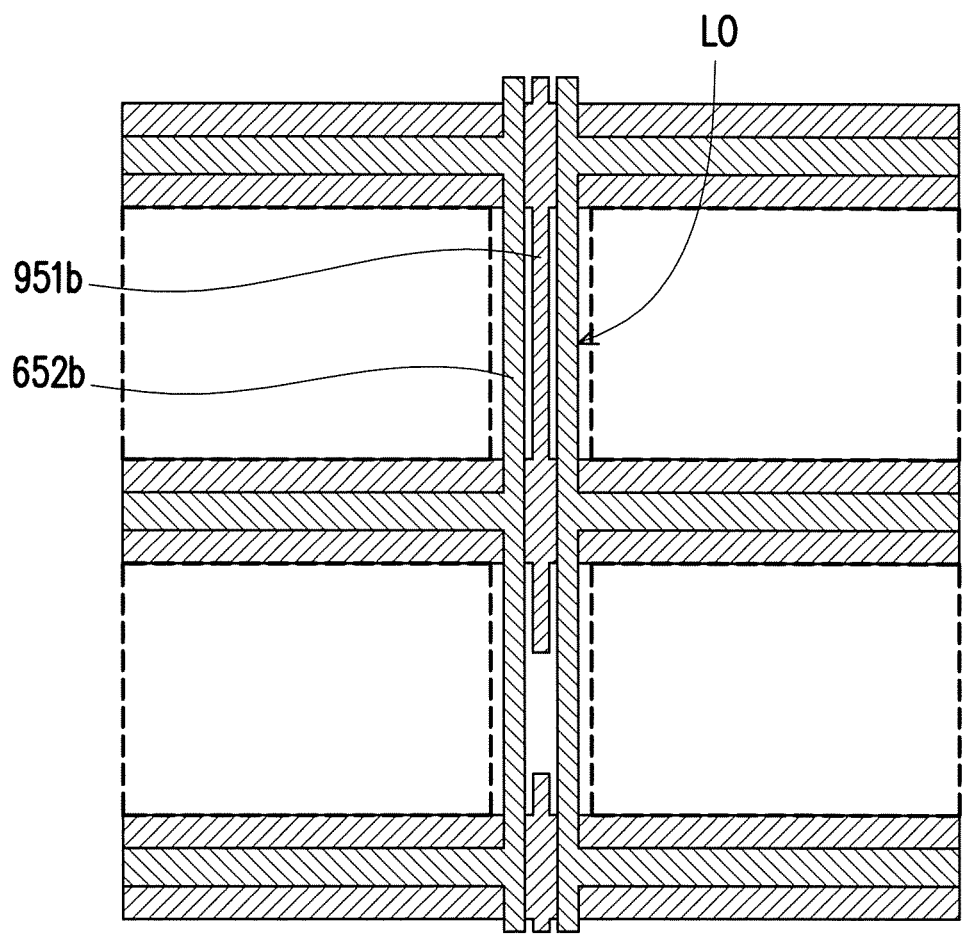
FIG. 9 is a schematic top view illustrating a display panel according to a ninth embodiment of the disclosure.

FIG. 9 is a schematic top view illustrating a sensing display panel according to a ninth embodiment of the disclosure. FIG. 9 omits drawings of some of the layers for clarity. A sensing display panel 900 of the ninth embodiment is similar to the sensing display panel 700 of the seventh embodiment. This ninth embodiment is described with referring to FIG. 9 for the sensing display panel 900. It is to be noted that, in FIG. 9, like or similar reference numerals represent like or similar components. Thus, components already described in FIG. 7 will not be described in the following.

Referring to FIG. 9, a plurality of second sensing electrodes 951b separated from each other and the plurality of fourth sensing electrodes 652b separated from each other may correspond to the same layout area LO, and the aforementioned second sensing electrodes 951b and the fourth sensing electrodes 652b may not overlap each other.

Figure 10:
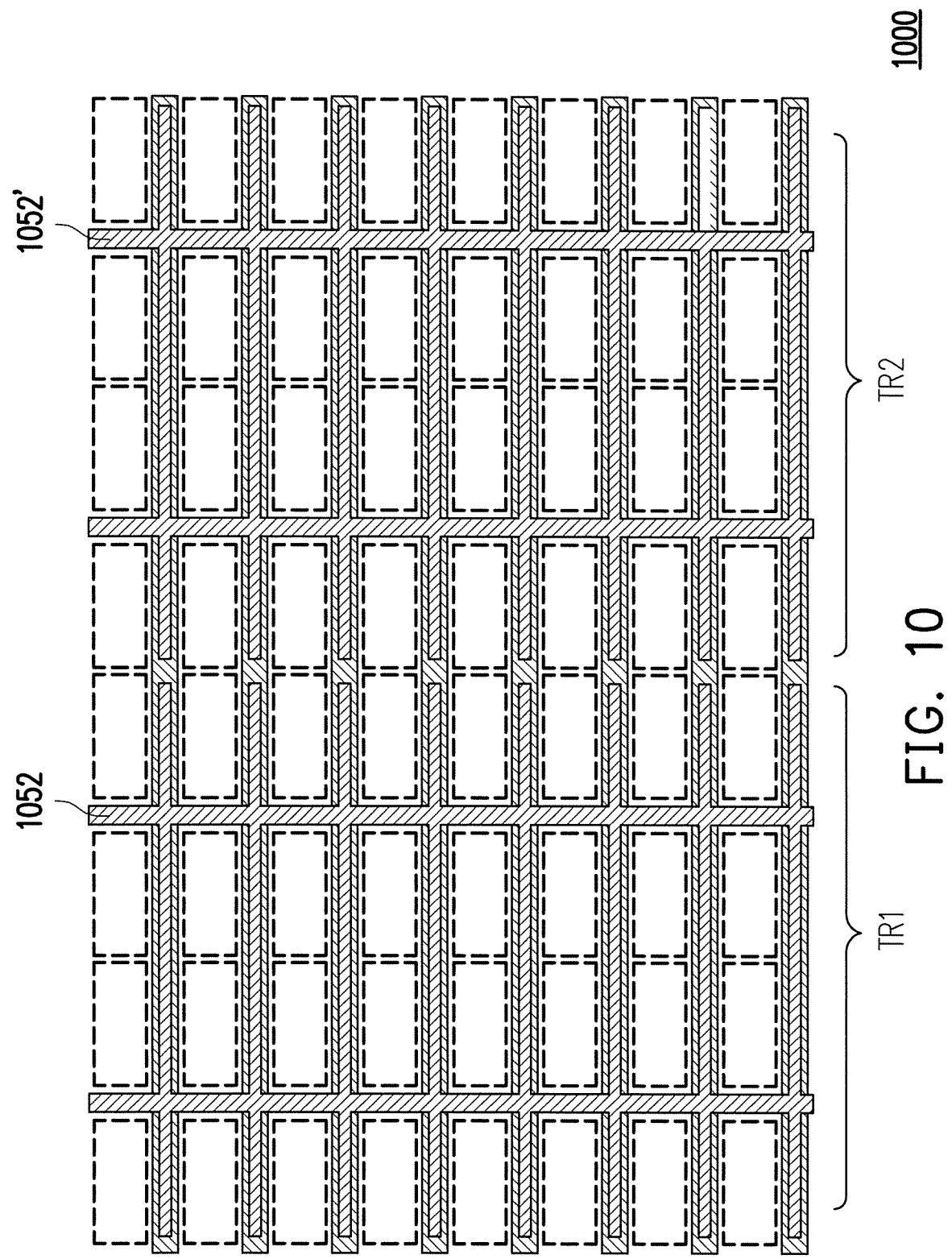
FIG. 10 is a schematic top view illustrating a display panel according to a tenth embodiment of the disclosure.

FIG. 10 is a schematic top view illustrating a sensing display panel according to a tenth embodiment of the disclosure. FIG. 10 omits drawings of some of the layers for clarity. A sensing display panel 1000 of the tenth embodiment is similar to the sensing display panel 500 of the fifth embodiment. This embodiment is described with referring to FIG. 10 for the sensing display panel 1000. It is to be noted that, in FIG. 10, like or similar reference numerals represent like or similar components. Thus, components already described in FIGS. 5A and 5B will not be described in the following.

Referring to FIG. 10, the sensing display panel 1000 has a first sensing region TR1 and a second sensing region TR2. A second sensing circuit 1052 located in the first sensing region TR1 and a second sensing circuit 1052' located in the second sensing region TR2 are separated from each other.

Figure 11:
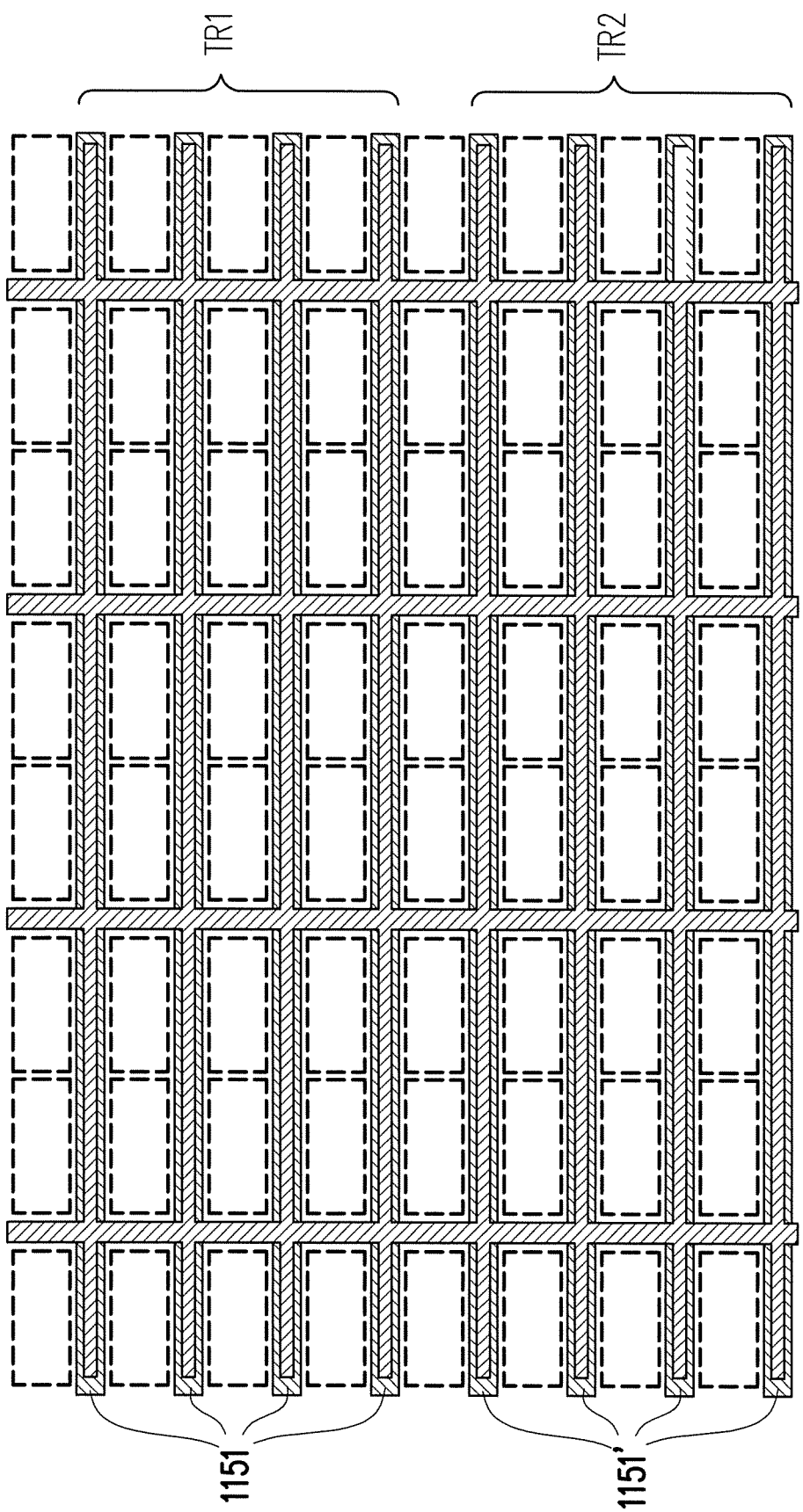
FIG. 11 is a schematic top view illustrating a display panel according to an eleventh embodiment of the disclosure.

FIG. 11 is a schematic top view illustrating a sensing display panel according to an eleventh embodiment of the disclosure. FIG. 11 omits drawings of some of the layers for clarity. A sensing display panel 1100 of the eleventh embodiment is similar to the sensing display panel 500 of the fifth embodiment. This eleventh embodiment is described with referring to FIG. 11 for the sensing display panel 1100. It is to be noted that, in FIG. 11, like or similar reference numerals represent like or similar components. Thus, components already described in FIGS. 5A and 5B will not be described in the following.

Referring to FIG. 11, the sensing display panel 1100 has a first sensing region TR1 and a second sensing region TR2. One first sensing circuit 1151 located in the first sensing region TR1 and another first sensing circuit 1151' located in the second sensing region TR2 are separated from each other.

Figure 12A:
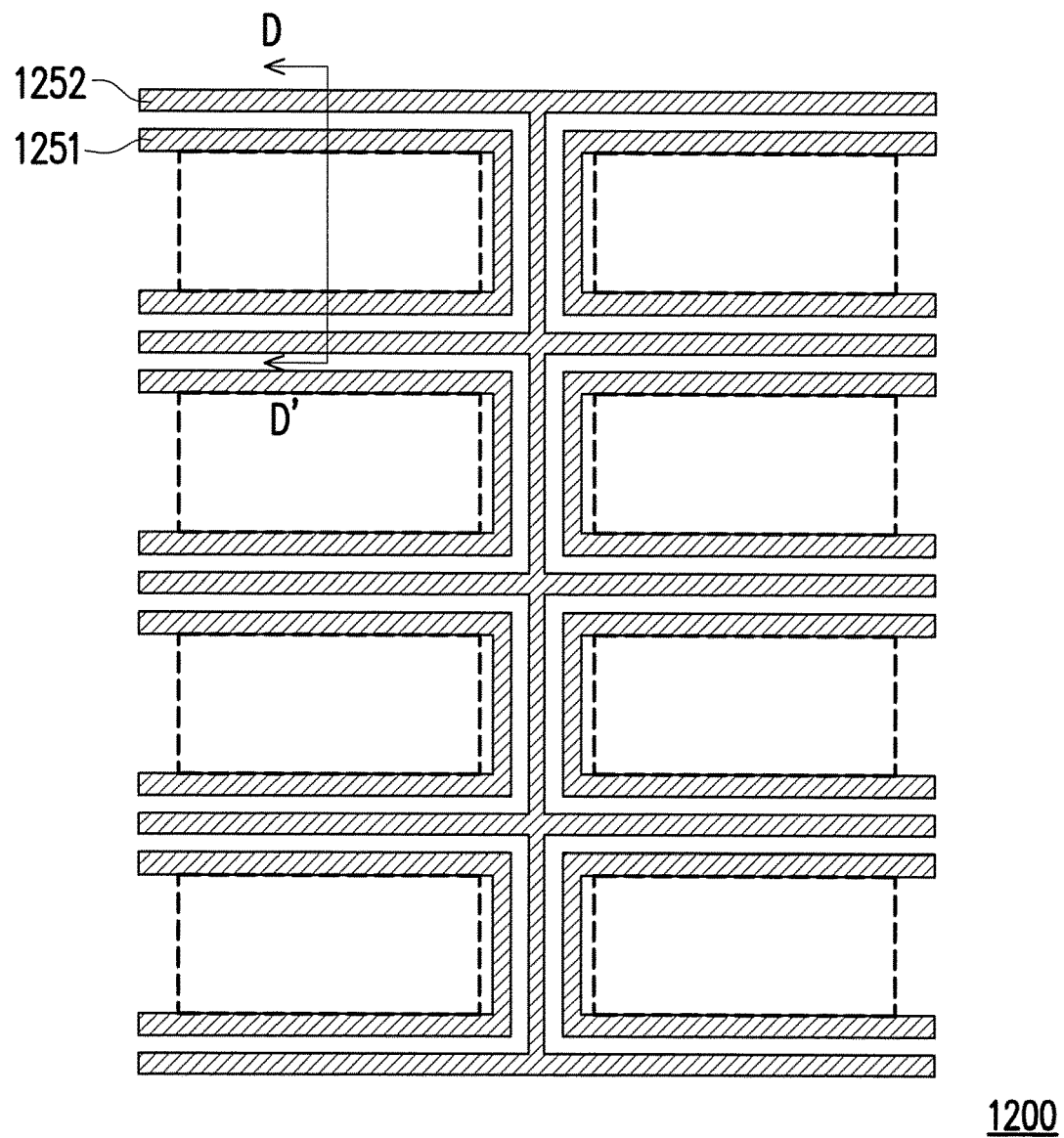
FIG. 12A is a schematic top view illustrating a display panel according to a twelfth embodiment of the disclosure.
Figure 12B:
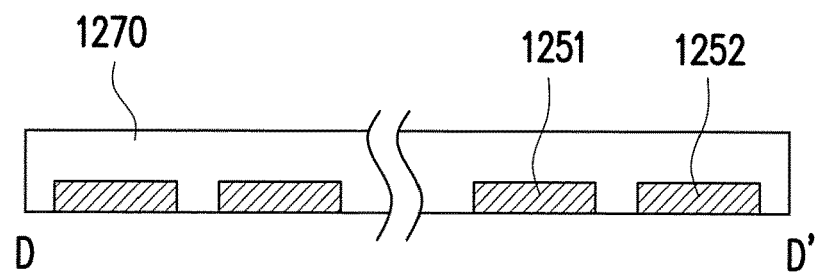
FIG. 12B is a schematic cross-sectional view of FIG. 12A along section line DD'.

FIG. 12A is a schematic top view illustrating a sensing display panel according to a twelfth embodiment of the disclosure. FIG. 12B is a schematic cross-sectional view of FIG. 12A along section line DD'. FIG. 12A omits drawings of some of the layers for clarity. A sensing display panel 1200 of the twelfth embodiment is similar to the sensing display panel 400 of the fourth embodiment. This twelfth embodiment is described with referring to FIGS. 12A and 12B for the sensing display panel 1200. It is to be noted that, in FIGS. 12A and 12B, like or similar reference numerals represent like or similar components. Thus, components already described in FIGS. 4A and 4B will not be described in the following.

Referring to FIGS. 12A and 12B, a first sensing circuit 1251 and a second sensing circuit 1252 may be patterned conductive layers of monolayer.

The first sensing circuit 1251 and/or the second sensing circuit 1252 may be stacked with other transflective layers (not shown) to form the optical resonant structure 140. In an embodiment, the first sensing circuit 1251 and the second sensing circuit 1252 may be the same patterned conductive layer. However, the scope of the disclosure is not limited thereto.

In an embodiment, the sensing display panel 1200 may further include an insulating layer 1270 covering the first sensing circuit 1251 and/or the second sensing circuit 1252 and located between the first sensing circuit 1251 and the second sensing circuit 1252.

Figure 13A:
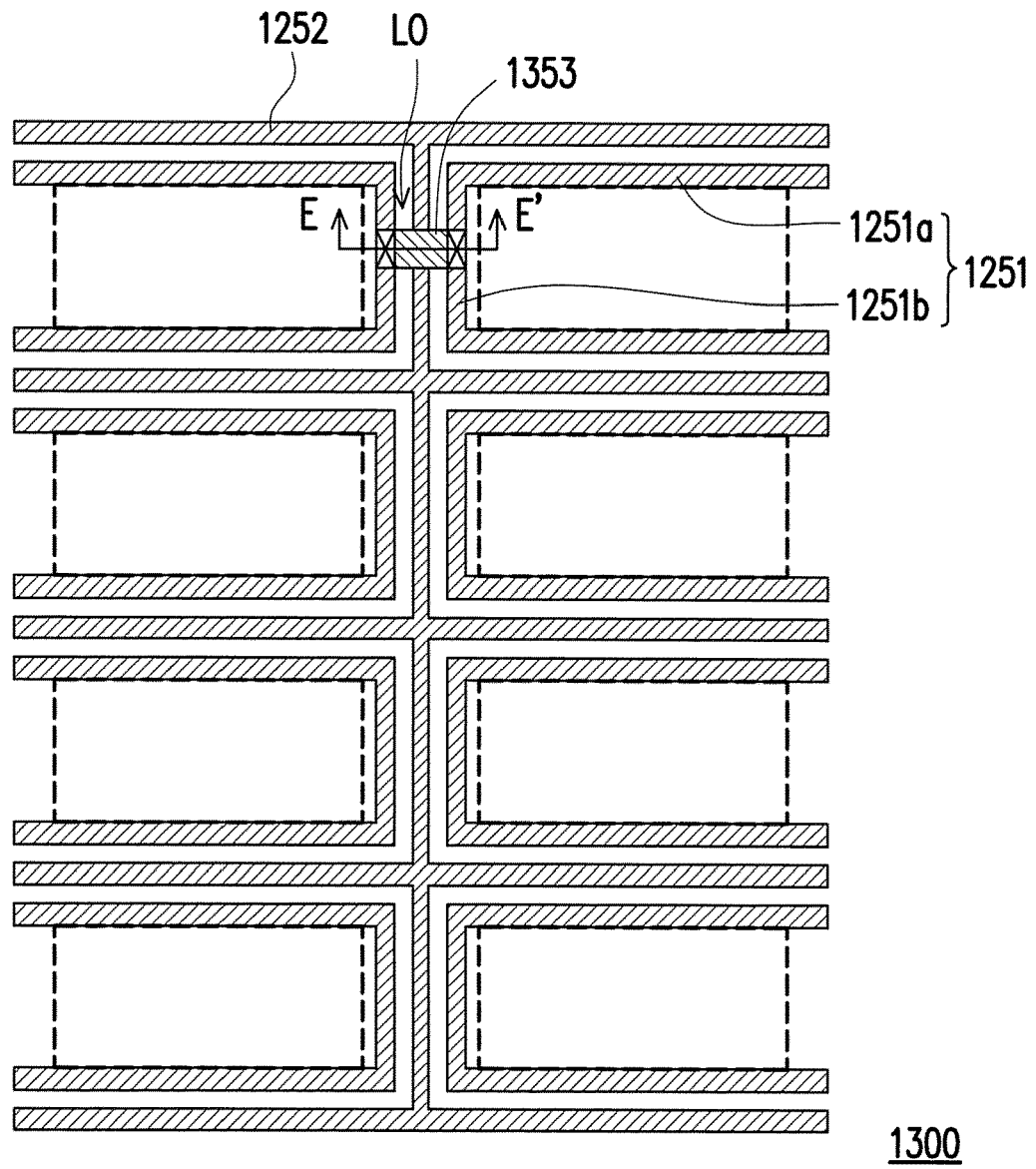
FIG. 13A is a schematic top view illustrating a display panel according to a thirteenth embodiment of the disclosure.
Figure 13B:
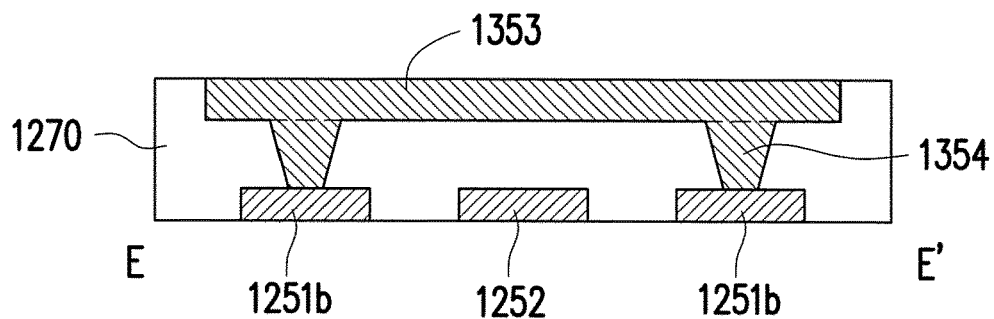
FIG. 13B is a schematic cross-sectional view of FIG. 13A along section line EE'.

FIG. 13A is a schematic top view illustrating a sensing display panel according to a thirteenth embodiment of the disclosure. FIG. 13B is a schematic cross-sectional view of FIG. 13A along a section line EE'. FIG. 13A omits drawings of some of the layers for clarity. A sensing display panel 1300 of the thirteenth embodiment is similar to the sensing display panel 1200 of the twelfth embodiment. This thirteenth embodiment is described with referring to FIGS. 13A and 13B for the sensing display panel 1300. It is to be noted that, in FIGS. 13A and 13B, like or similar reference numerals represent like or similar components. Thus, components already described in FIGS. 12A and 12B will not be described in the following.

Referring to FIGS. 13A and 13B, the sensing display panel 1300 further includes at least one bridge electrode 1353 located in the layout area LO.

The insulating layer 1270 is located between the bridge electrode 1353 and the first sensing circuit 1251 and between the bridge electrode 1353 and the second sensing circuit 1252. A plurality of conductive vias 1354 penetrate the insulating layer 1270, and the first sensing circuit 1251 located on opposite sides of the second sensing circuit 1252 may be electrically connected to the corresponding bridge electrode 1353 through the plurality of conductive vias 1354.

In the embodiment, the first sensing circuit 1251 and the second sensing circuit 1252 are located between the bridge electrode 1353 and the substrate 110 (shown in FIGS. 1B, 2, or 3 and the like), but the scope of the disclosure is not limited thereto. In other embodiments, the bridge electrode 1353 may be located between the first sensing circuit 1251 and/or the second sensing circuit 1252 and the substrate 110.

In this embodiment, the extending direction of the bridge electrode 1353 is substantially parallel to the extending direction of the first sensing electrode 1251a (the extending direction is similar to that of the first sensing electrode 451a). However, the scope of the disclosure is not limited thereto. In some embodiments, the extending direction of the bridge electrode 1353 is substantially parallel to the extending direction of the second sensing electrode 1251b (the extending direction is similar to that of the second sensing electrode 451b).

Figure 14:
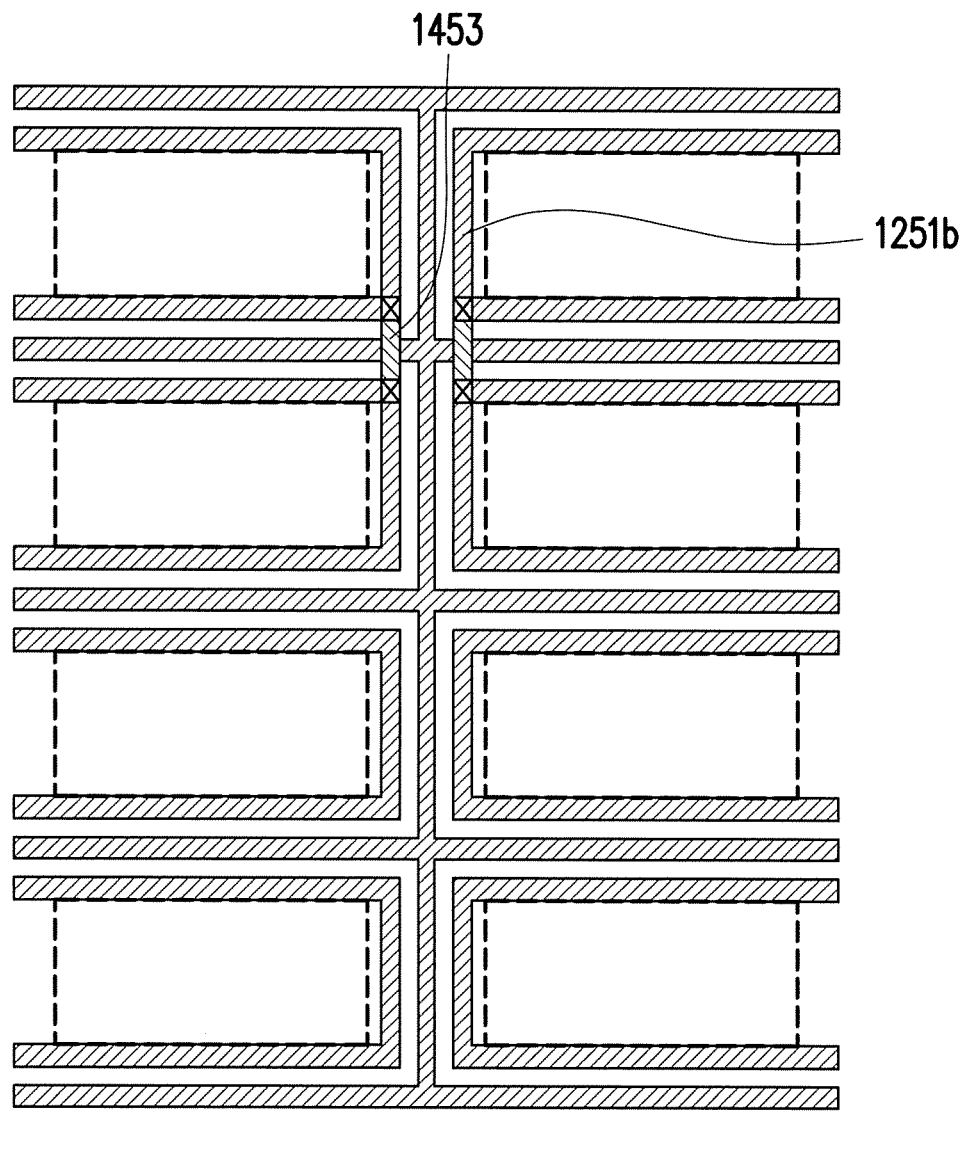
FIG. 14 is a schematic top view illustrating a display panel according to a fourteenth embodiment of the disclosure.

FIG. 14 is a schematic top view illustrating a sensing display panel according to a fourteenth embodiment of the disclosure. FIG. 14 omits drawings of some of the layers for clarity. A sensing display panel 1400 of the fourteenth embodiment is similar to the sensing display panel 1300 of the thirteenth embodiment. This fourteenth embodiment is described with referring to FIG. 14 for the sensing display panel 1400. It is to be noted that, in FIG. 14, like or similar reference numerals represent like or similar components. Thus, components already described in FIGS. 13A and 13B will not be described in the following.

Referring to FIG. 14, the extending direction of a bridge electrode 1453 is substantially parallel to the extending direction of the second sensing electrode 1251b.

Figure 15:
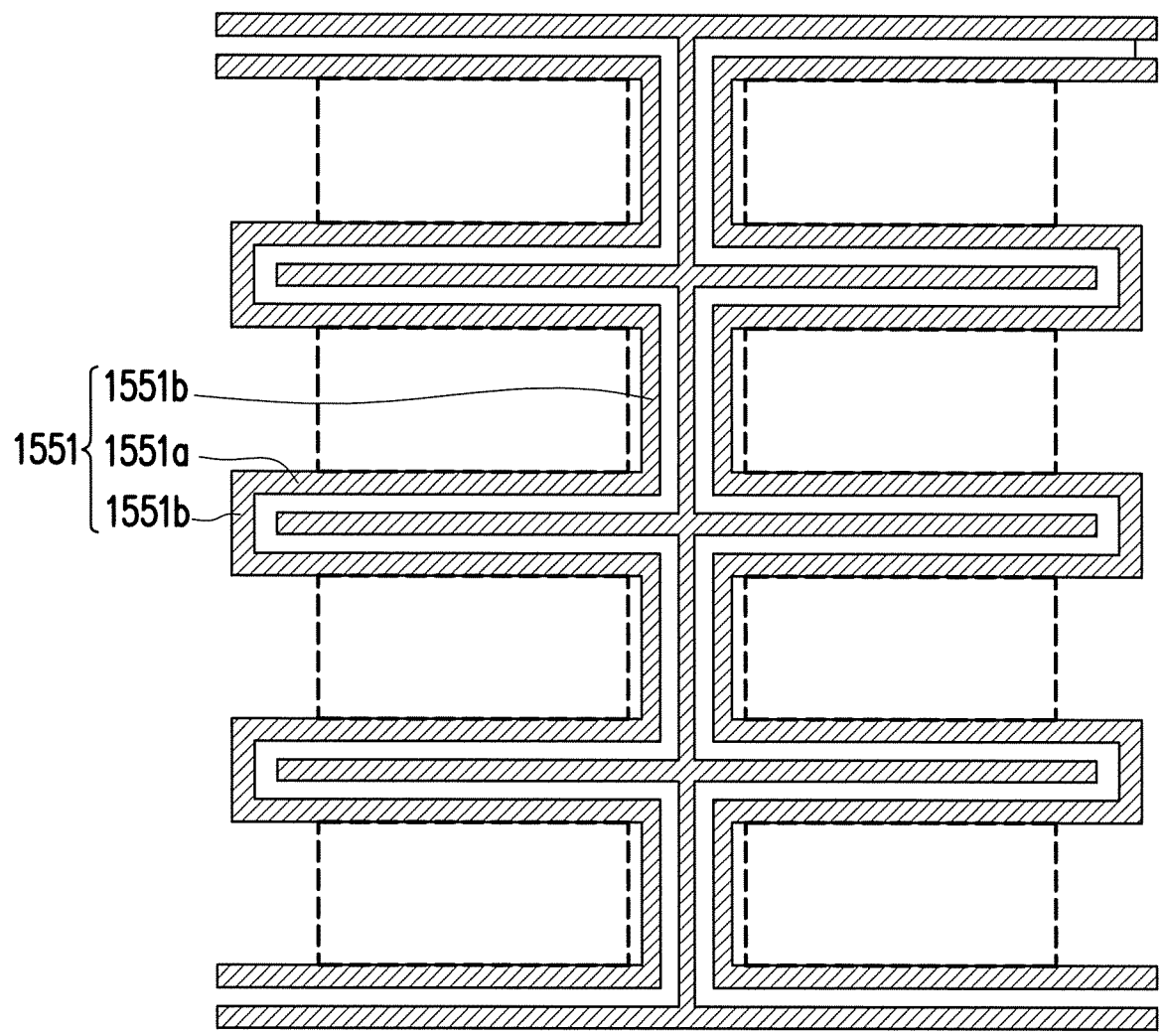
FIG. 15 is a schematic top view illustrating a display panel according to a fifteenth embodiment of the disclosure.

FIG. 15 is a schematic top view illustrating a sensing display panel according to a fifteenth embodiment of the disclosure. FIG. 15 omits drawings of some of the layers for clarity. A sensing display panel 1500 of the fifteenth embodiment is similar to the sensing display panel 1200 of the twelfth embodiment. This fifteenth embodiment is described with referring to FIG. 15 for the sensing display panel 1500. It is to be noted that, in FIG. 15, like or similar reference numerals represent like or similar components. Thus, components already described in FIGS. 12A and 12B will not be described in the following.

Referring to FIG. 15, two adjacent first sensing electrodes 1551a are connected to each other through a corresponding second sensing electrode 1551b, and a first sensing circuit 1551 located in the layout area LO shows a meandering distribution.

Figure 16:
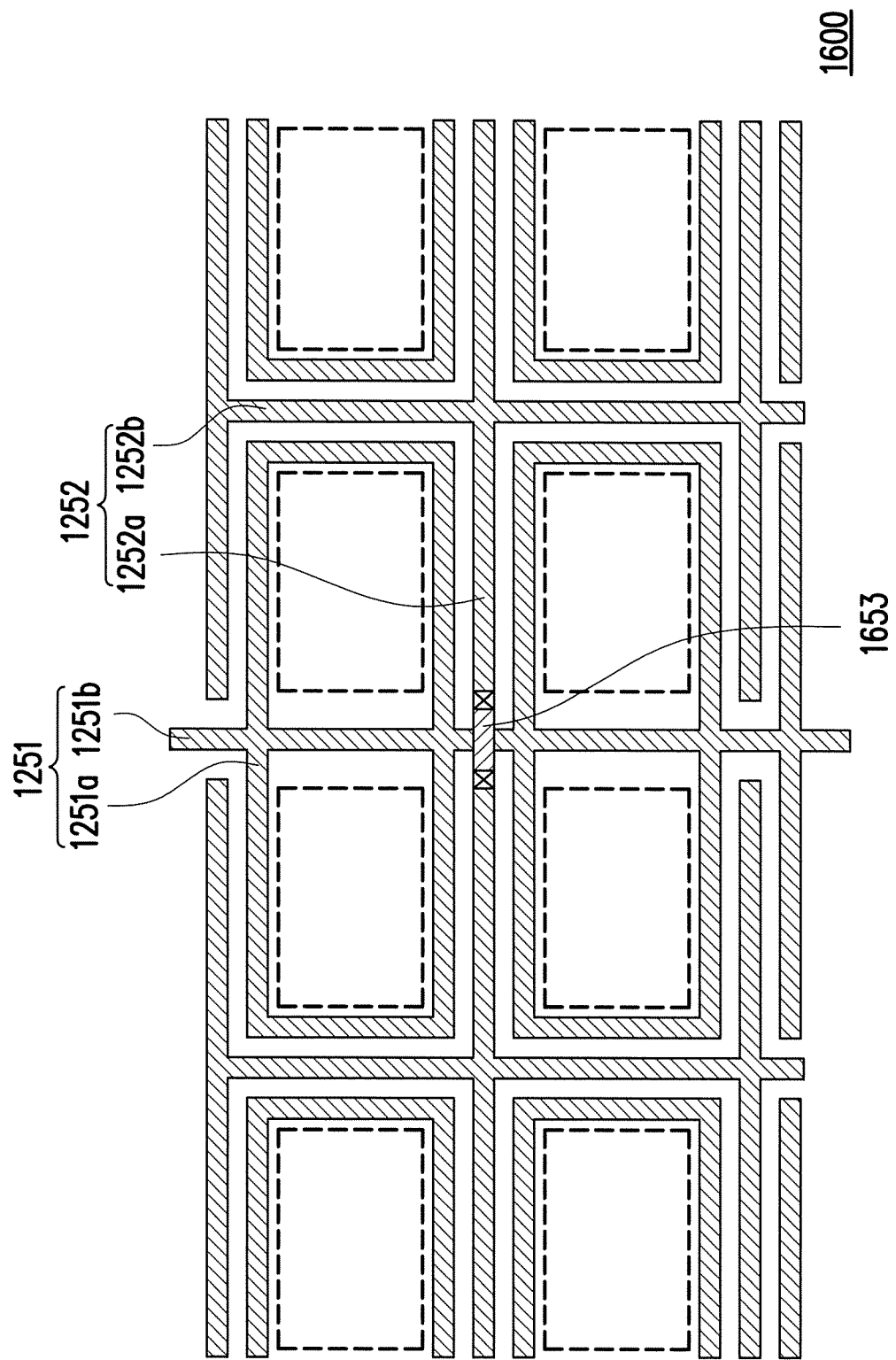
FIG. 16 is a schematic top view illustrating a display panel according to a sixteenth embodiment of the disclosure.

FIG. 16 is a schematic top view illustrating a sensing display panel according to a sixteenth embodiment of the disclosure. FIG. 16 omits drawings of some of the layers for clarity. A sensing display panel 1600 of the sixteenth embodiment is similar to the sensing display panel 1300 of the thirteenth embodiment. This sixteenth embodiment is described with referring to FIG. 16 for the sensing display panel 1600. It is to be noted that, in FIG. 16, like or similar reference numerals represent like or similar components. Thus, components already described in FIGS. 13A and 13B will not be described in the following.

Referring to FIG. 16, the third sensing electrodes 1252a located on opposite sides of the second sensing electrode 1251b may be electrically connected to each other through a bridge electrode 1653.

Figure 17:
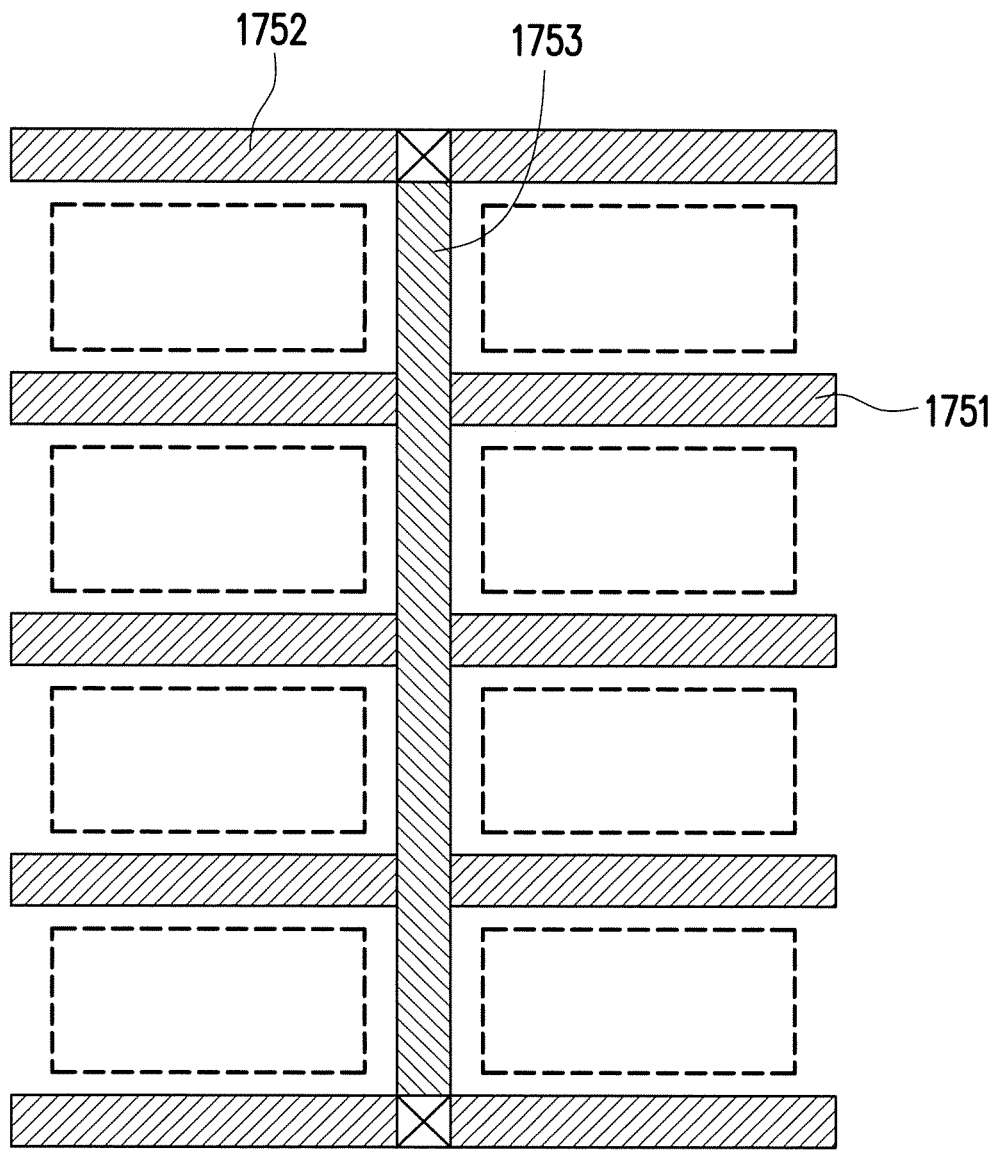
FIG. 17 is a schematic top view illustrating a display panel according to a seventeenth embodiment of the disclosure.

FIG. 17 is a schematic top view illustrating a sensing display panel according to a seventeenth embodiment of the disclosure. FIG. 17 omits drawings of some of the layers for clarity. A sensing display panel 1700 of the seventeenth embodiment is similar to the sensing display panel 1400 of the fourteenth embodiment. This seventeenth embodiment is described with referring to FIG. 17 for the sensing display panel 1700. It is to be noted that, in FIG. 17, like or similar reference numerals represent like or similar components. Thus, components already described in FIG. 14 will not be described in the following.

Referring to FIG. 17, a first sensing circuit 1751 and/or a second sensing circuit 1752 may be a plurality of stripe electrodes, and the second sensing circuits 1752 located on opposite sides of the first sensing circuit 1751 may be electrically connected to each other through a bridge electrode 1753.

The following examples are used to demonstrate that the color saturation of the display panel or the sensing display panel according to some embodiments of the disclosure can be improved. However, these examples are considered as exemplary embodiments only, and the scope of the disclosure is not limited to the exemplary embodiments set forth herein.

FIGS. 18A to 23B show various comparisons illustrating the relationship between the examples with the optical resonant structure and the comparative examples without the optical resonance structure. Referring to FIGS. 18A to 23B, the comparison relationship may be estimated by simulation software. In the display or the sensing display panel of the foregoing embodiments, the comparison diagrams of the emission spectrum or the color gamut of the display panel or the sensing display panel is estimated under a state that the display device emits different color lights having standard wavelengths. The standard wavelengths of different color lights are defined by the International Commission on Illumination (CIE) in 1931. The comparison diagrams of color gamut may be represented according to the CIE 1931 color space.

In addition. In each of the examples, the optical resonant structure has a first width, the dielectric layer has a first thickness and a first refractive index, and the light exits from the optical resonance structure through an emergent medium (for example, a hard coat layer) has a second refractive index, and these may conform to the relationship represented by the aforementioned equation (1).

It is to be noted that the values shown below may include the values and deviations in the range of tolerances that are acceptable to those skilled in the art. The deviations may be one or more standard deviations in the manufacturing process or the measurement process, or calculation errors generated in the calculation or the conversion process due to the number of used digits, rounding, or other factors such as error propagation.

EXAMPLE 1

The difference between Example 1 and Comparative Example is that Example 1 has the optical resonant structure, wherein the first transflective layer and the second transflective layer form the optical resonant structure, and each has a thickness of 5 nm. The simulation results are shown in FIGS. 18A to 20B and the following Table 1.

Figure 18A:
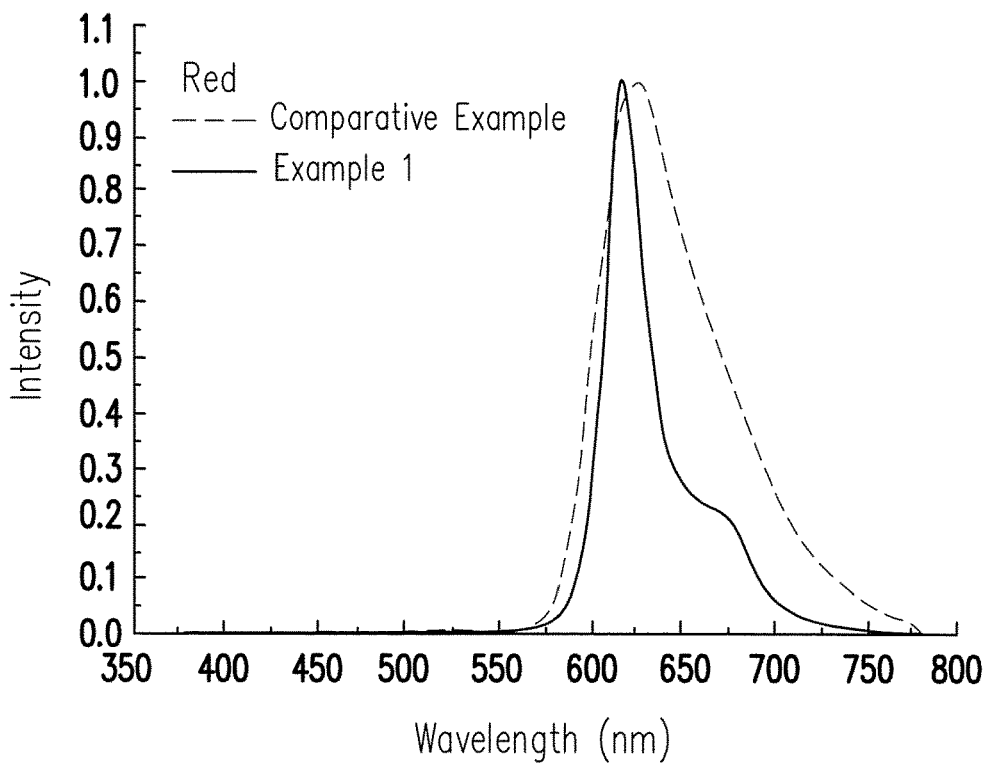
FIG. 18A shows an emission spectrum comparison illustrating a display panel or a sensing display panel of example 1 vs. a display panel or a sensing display panel of comparative example under the state that the display device emits red light.
Figure 19A:
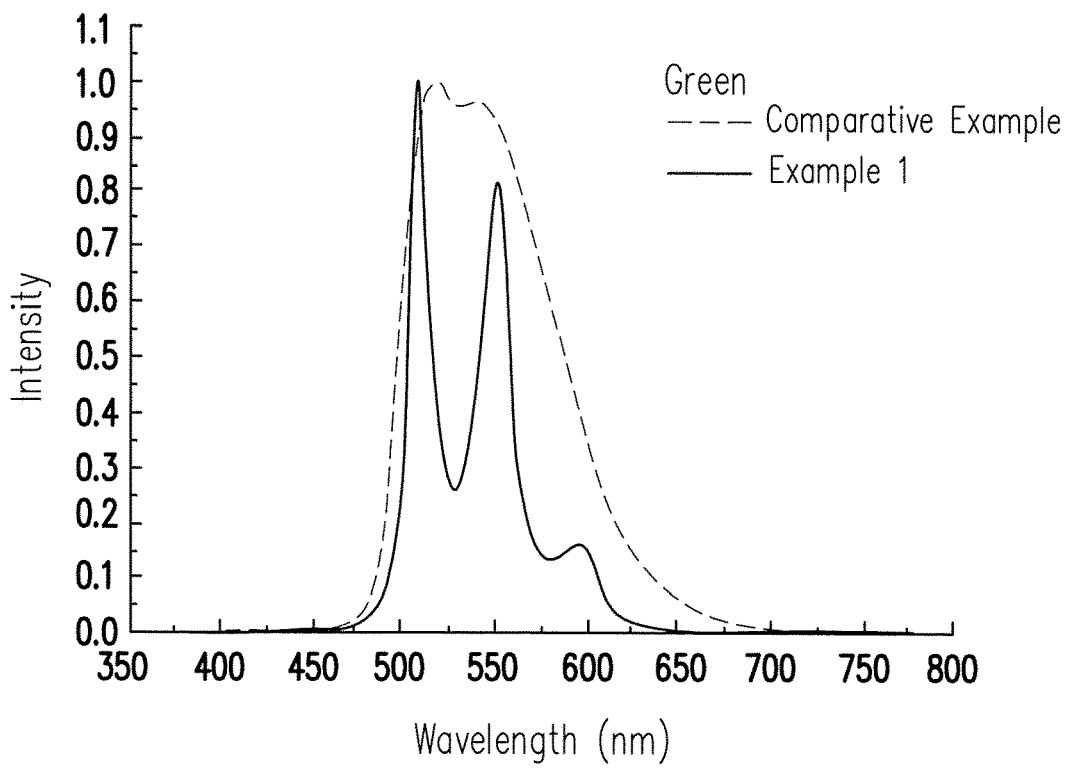
FIG. 19A shows an emission spectrum comparison illustrating a display panel or a sensing display panel of example 1 vs. a display panel or a sensing display panel of comparative example under the state that the display device emits green light.
Figure 20A:
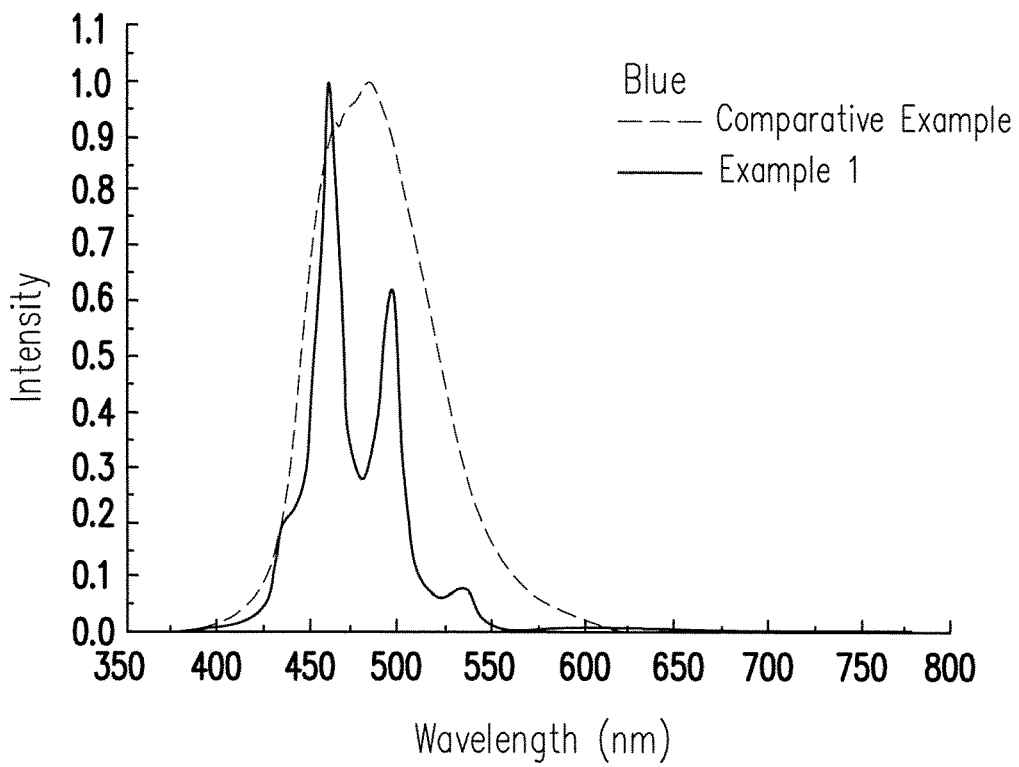
FIG. 20A shows an emission spectrum comparison illustrating a display panel or a sensing display panel of example 1 vs. a display panel or a sensing display panel of comparative example under the state that the display device emits blue light.

FIGS. 18A, 19A, and 20A show the comparison diagrams of emission spectrum of the display panel or the sensing display panel of Example 1 and Comparative Example, wherein both display devices thereof emit red light, green light, and blue light, respectively. In the above-mentioned comparison diagrams of emission spectrum, the horizontal axis represents the emission wavelength (unit: nm), the vertical axis represents the relative intensity ratio of the intensity of the emitted light at each wavelength to the intensity of the emitted light having the maximum intensity, that is, the relative intensity between the emitted light of each wavelength.

Figure 18B:
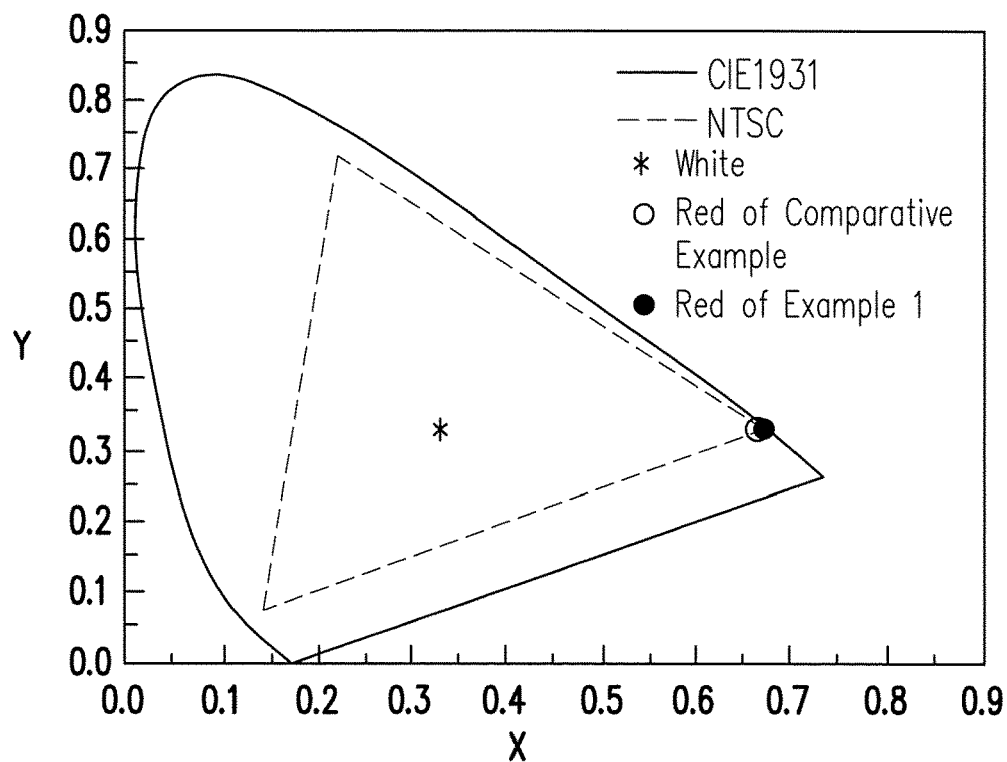
FIG. 18B shows a color gamut comparison illustrating a display panel or a sensing display panel of example 1 vs. a display panel or a sensing display panel of comparative example under the state that the display device emits red light.
Figure 19B:
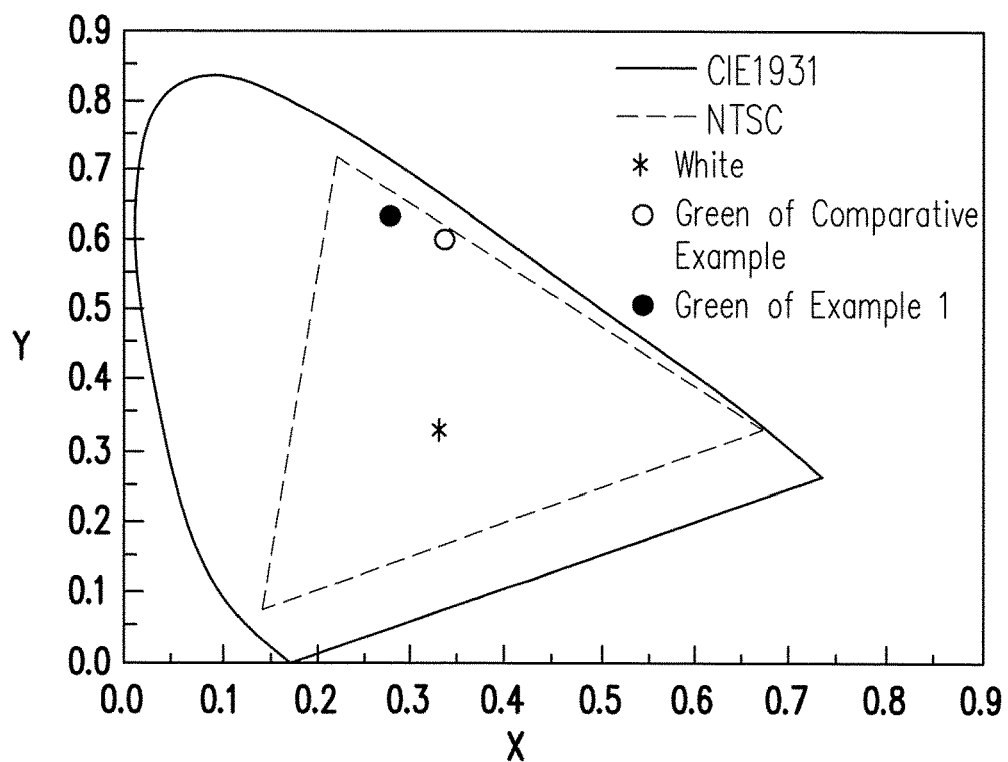
FIG. 19B shows a color gamut comparison illustrating a display panel or a sensing display panel of example 1 vs. a display panel or a sensing display panel of comparative example under the state that the display device emits green light.
Figure 20B:
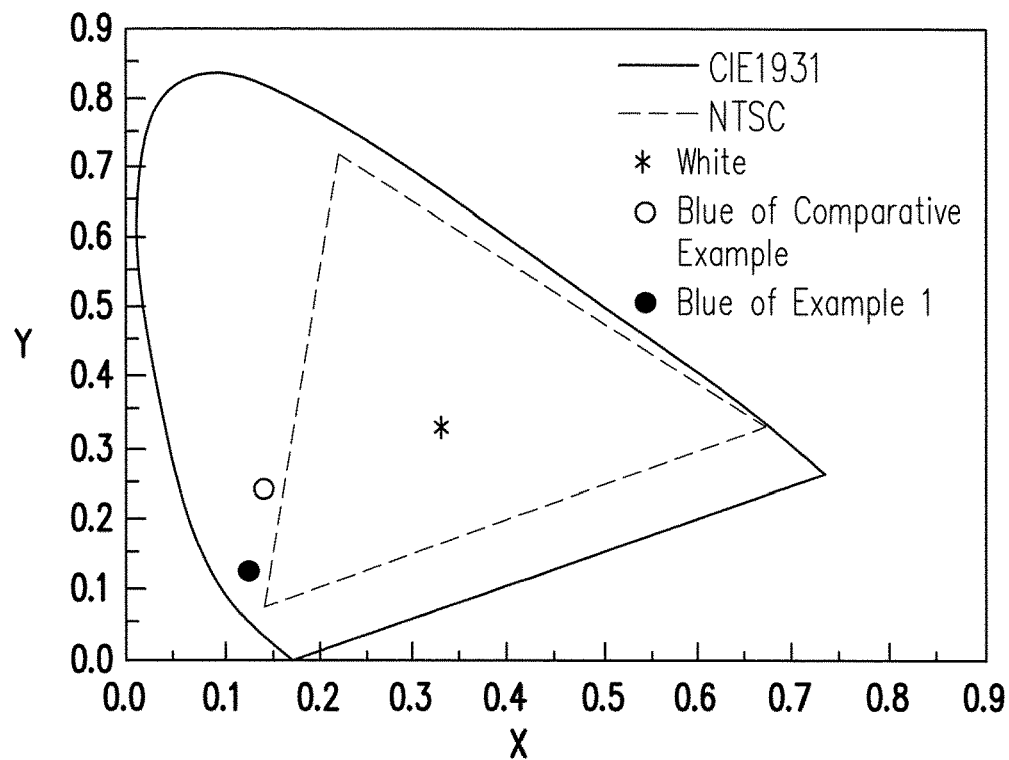
FIG. 20B shows a color gamut comparison illustrating a display panel or a sensing display panel of example 1 vs. a display panel or a sensing display panel of comparative example under the state that the display device emits blue light.
Figure 21A:
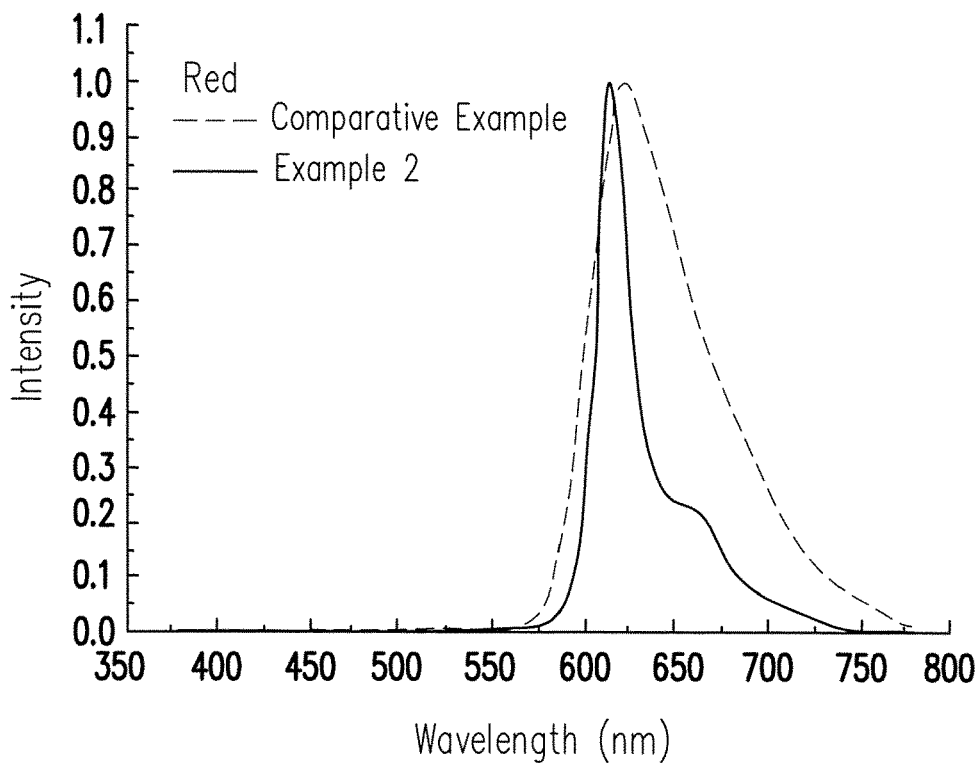
FIG. 21A shows an emission spectrum comparison illustrating a display panel or a sensing display panel of example 2 vs. a display panel or a sensing display panel of comparative example under the state that the display device emits red light.
Figure 21B:
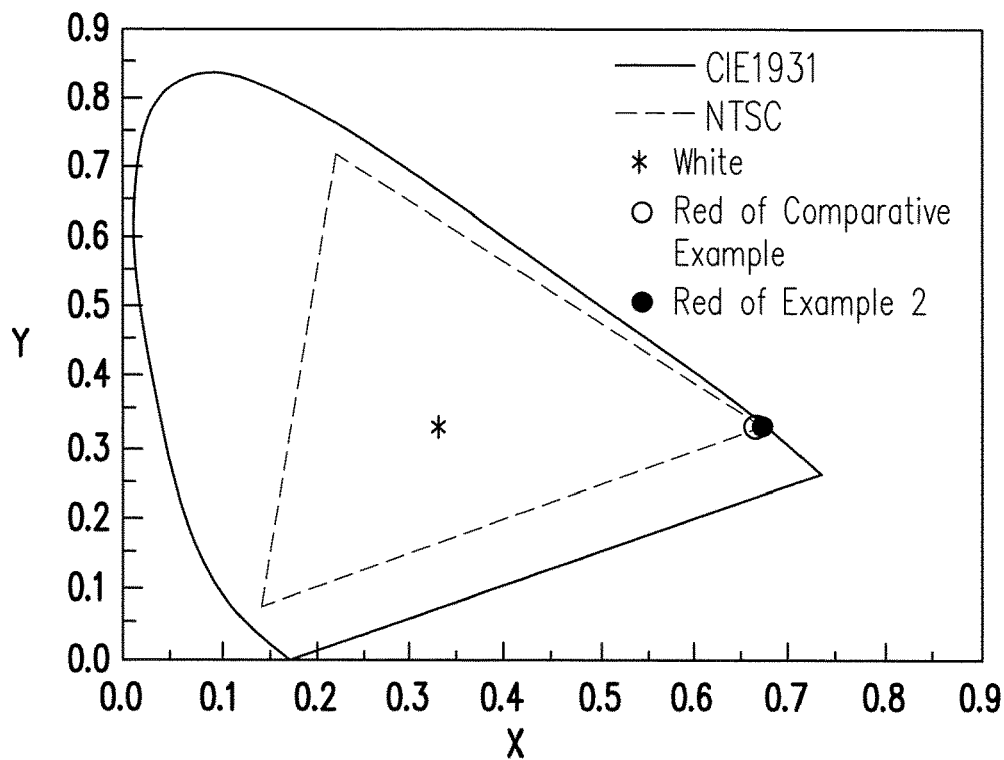
FIG. 21B shows a color gamut comparison illustrating a display panel or a sensing display panel of example 2 vs. a display panel or a sensing display panel of comparative example under the state that the display device emits red light.
Figure 22A:
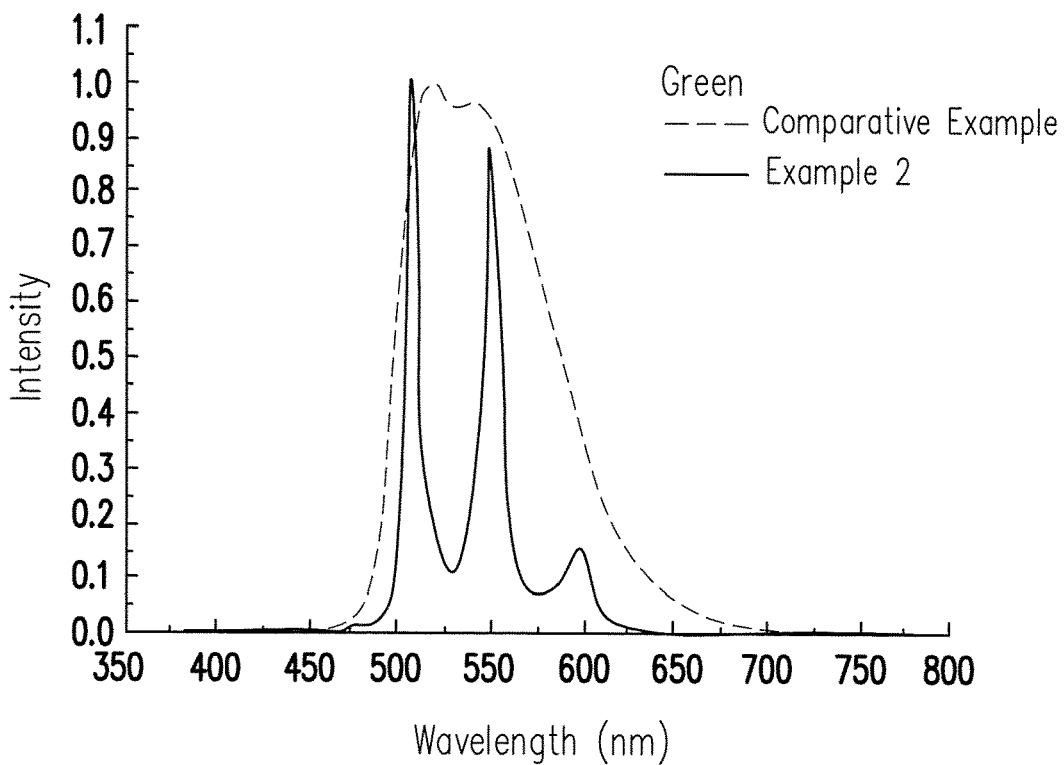
FIG. 22A shows an emission spectrum comparison illustrating a display panel or a sensing display panel of example 2 vs. a display panel or a sensing display panel of comparative example under the state that the display device emits green light.
Figure 22B:
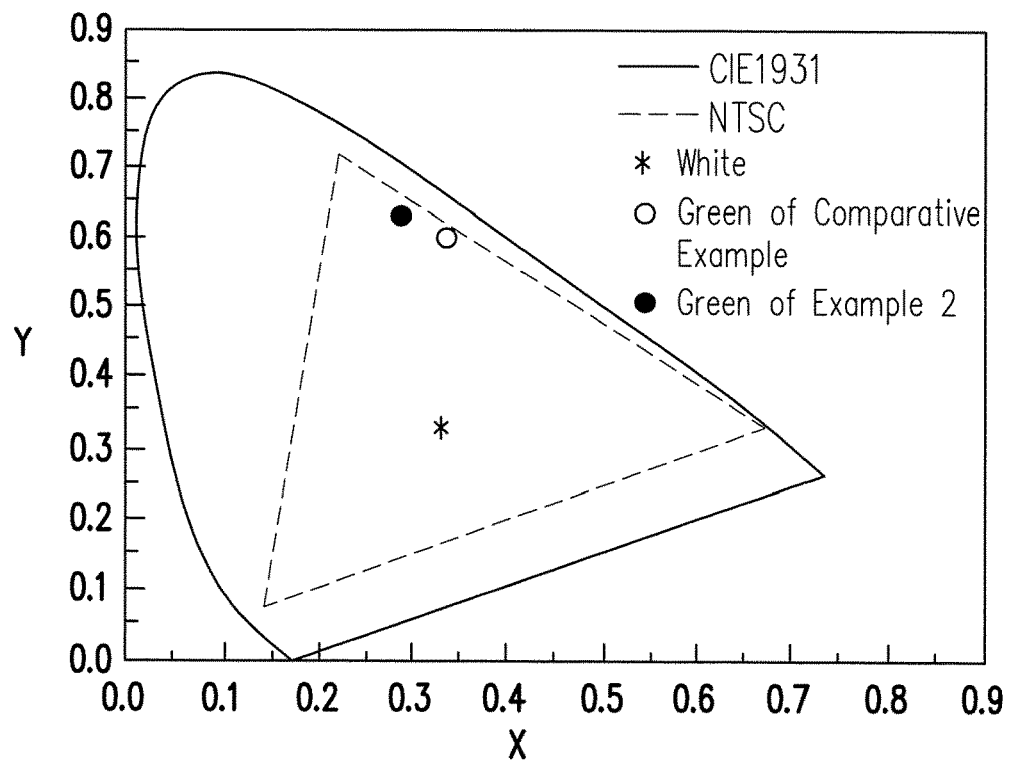
FIG. 22B shows a color gamut comparison illustrating a display panel or a sensing display panel of example 2 vs. a display panel or a sensing display panel of comparative example under the state that the display device emits green light.
Figure 23A:
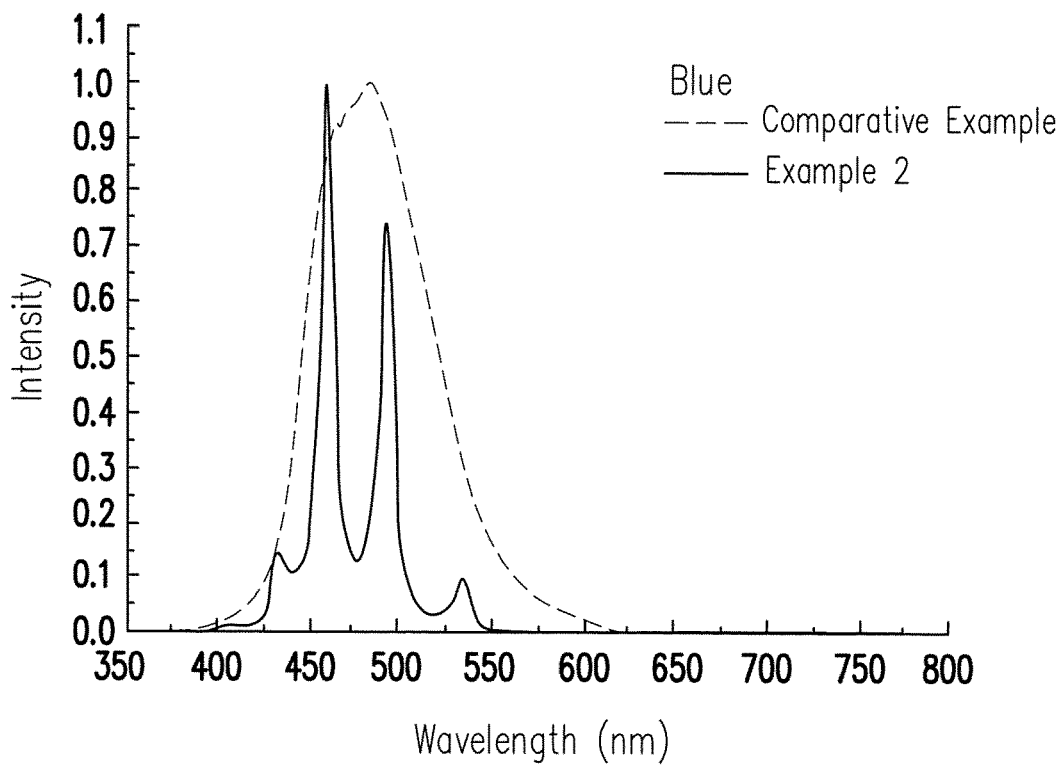
FIG. 23A shows an emission spectrum comparison illustrating a display panel or a sensing display panel of example 2 vs. a display panel or a sensing display panel of comparative example under the state that the display device emits blue light.
Figure 23B:
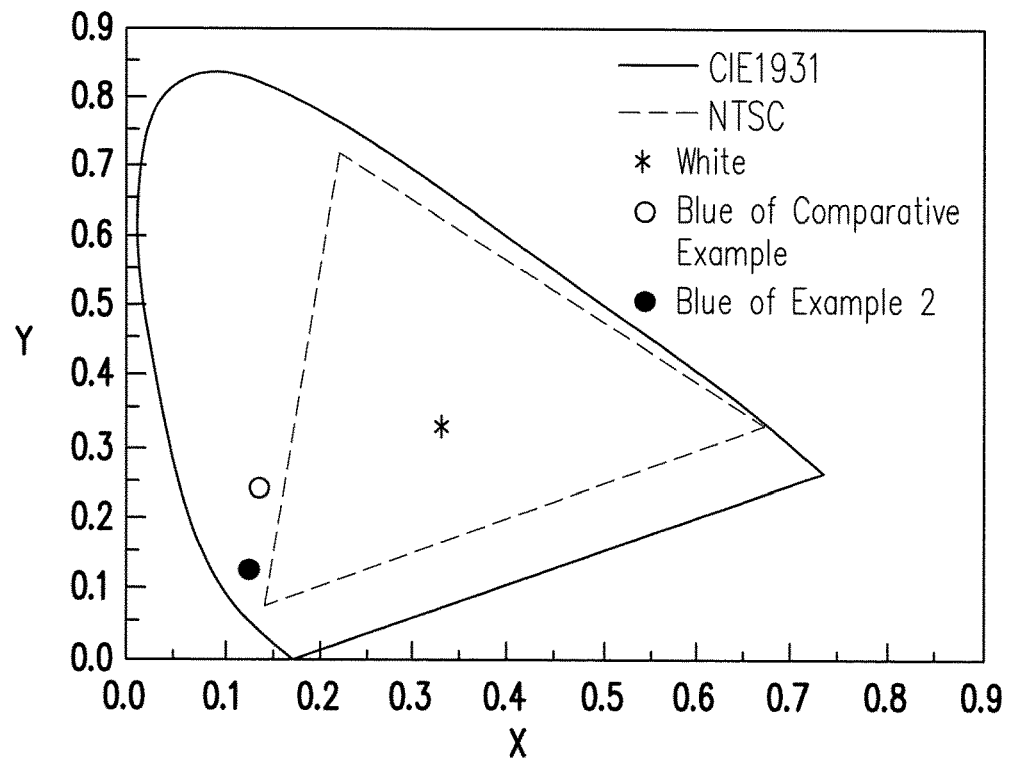
FIG. 23B shows a color gamut comparison illustrating a display panel or a sensing display panel of example 2 vs. a display panel or a sensing display panel of comparative example under the state that the display device emits blue light.

FIGS. 18B, 19B and 20B show the comparison diagrams of color gamut of the display panel or the sensing display panel of Example 1 and Comparative Example, wherein both display devices thereof emit red light, green light, and blue light, respectively. The comparison diagrams of color gamut of FIGS. 18B, 19B, and 20B correspond to the comparison diagrams of emission spectrum of FIGS. 18A, 19A, and 20A, respectively. In the above-mentioned comparison diagrams of color gamut, the horseshoe-shaped area surrounded by the solid line (marked as CIE1931) represents spectral locus of general human visual color gamut; the triangular area surrounded by the dotted line (marked as NTSC) represents chroma values of three primary colors (red, green, and blue) defined by the National Television System Committee in 1953 according to the phosphor technology of cathode ray tube at the time and three chromaticity coordinates of the three primary colors are red chromaticity coordinates (0.67, 0.33), green chromaticity coordinates (0.21, 0.71), and blue chromaticity coordinates (0.14, 0.08), respectively; the solid points and the dotted points represent the positions of chromaticity coordinates corresponding to the emission spectrum of Example 1 and Comparative Example, respectively; the asterisk represents the chromaticity in the chromaticity coordinates of standard C light source defined by the International Commission on Illumination (CIE).

In the following Table 1, the chromaticity coordinates of the red light, the chromaticity of the green light, and the chromaticity coordinates of the blue light are the chromaticity coordinates of each of the solid points (Example 1) and the dotted points (Comparative Example) in FIGS. 18B, 19B, and 20B, respectively. The color gamut area is the triangle area surrounded by the red light chromaticity coordinates, the green light chromaticity coordinates and the blue light chromaticity coordinates. The NTSC percentage is a ratio of the aforementioned color gamut area to the triangular area surrounded by the dotted line. That is, if the NTSC percentage is closer to 1, the color saturation of the display panel or the sensing display panel is closer to the color saturation of the red, green, and blue primary colors defined by the National Television System Committee.

Referring to FIGS. 18A to 20B and the following Table 1, in contrast to the Comparative Example, the full width at a half maximum (FWHM) of the Example 1 is narrower. That is, the Fabry-perot effect produced by the micro-cavity structure will enhance the emitted light of a particular wavelength to improve the color saturation of the display panel or sensing display panel.

TABLE 1

|  | Red Light Chromaticity Coordinates | Green Light Chromaticity Coordinates | Blue Light Chromaticity Coordinates | Color Gamut Area | NTSC Percentage |
|---|---|---|---|---|---|
| Comparative Example | (0.665, 0.326) | (0.337, 0.603) | (0.139, 0.238) | 0.087 | 55.1% |
| Example 1 | (0.672, 0.326) | (0.282, 0.635) | (0.129, 0.119) | 0.124 | 78.6% |

EXAMPLE 2

In the Example 2, the first transflective layer and the second transflective layer form the optical resonant structure, and each transflective layer has a thickness of 10 nm. The simulation results are shown in FIGS. 21A to 23B and the Table 2 below.

The representations of FIGS. 21A to 23B are similar to those shown in FIGS. 18A to 20B, the representation of Table 2 is similar to that shown in Table 1, and no description is repeated here.

Referring to FIGS. 21A to 23B and the following Table 2, in contrast to the Comparative Example, the full width at a half maximum (FWHM) of the Example 2 is narrower. That is, the Fabry-perot effect produced by the micro-cavity structure will enhance the light of a particular wavelength to improve the color saturation of the display panel or sensing display panel.

TABLE 2

|  | Red Light Chromaticity Coordinates | Green Light Chromaticity Coordinates | Blue Light Chromaticity Coordinates | Color Gamut Area | NTSC Percentage |
|---|---|---|---|---|---|
| Comparative Example | (0.665, 0.326) | (0.337, 0.603) | (0.139, 0.238) | 0.087 | 55.1% |
| Example 1 | (0.673, 0.325) | (0.288, 0.631) | (0.129, 0.125) | 0.122 | 77.0% |

The display panel or the sensing display panel according to embodiments of the present disclosure may include the optical resonance structure to improve the color saturation of the display panel or the sensing display panel. In addition, in the display panel or the sensing display panel according to the embodiments of the present disclosure, an electronic device may be located on the layout area of the substrate to enhance the aperture ratio or the light transmittance of the display panel or the sensing display panel.

It will be clear that various modifications and variations can be made to the disclosure. It is intended that the specification and examples be considered as exemplary embodiments only, with a scope of the disclosure being indicated by the following claims and their equivalents.

What is claimed is:

1. A display panel, comprising:
    a substrate having a layout area and a light transmitting area located outside the layout area;
    a display device disposed on the layout area of the substrate, and the display device comprising a first display electrode, a second display electrode, and a display media layer disposed between the first display electrode and the second display electrode;
    a dielectric layer disposed on the substrate and cover the display device; and
    an optical resonance structure disposed on the dielectric layer and distributed correspondingly to the display device, and the optical resonance structure comprising a first transflective layer and a second transflective layer stacked on the display device and separated from each other, wherein the first transflective layer overlaps with the second transflective layer, and the first transflective layer of the optical resonance structure is a first sensing circuit of a sensing device, the second transflective layer of the optical resonance structure is a second sensing circuit of the sensing device.

2. The display panel as claimed in claim 1, further comprising a sensing device disposed on the dielectric layer and the layout area of the substrate, wherein the sensing device comprises a first sensing circuit and a second sensing circuit electrically insulated from each other.

3. The display panel as claimed in claim 1, further comprising an insulating layer located between the first transflective layer and the second transflective layer.

4. The display panel as claimed in claim 1, further comprising a first sensing circuit, wherein the first transflective layer and the second transflective layer of the optical resonance structure form a second sensing circuit, and the first sensing circuit and the second sensing circuit form a sensing device.

5. The display panel as claimed in claim 4, further comprising a light transmitting conductive layer located between the first transflective layer and the second transflective layer.

6. The display panel as claimed in claim 1, further comprising a sensing device, wherein the sensing device comprises a plurality of sensing circuits, a plurality of conductive vias, and at least one bridge electrode, the plurality of conductive vias are located between the plurality of sensing circuits and the at least one bridge electrode, and a part of the plurality of sensing circuits respectively electrically connect to the at least one bridge electrode through the plurality of conductive vias.

7. The display panel as claimed in claim 1, wherein the first display electrode and the second display electrode comprise at least one light transmitting electrode.

8. The display panel as claimed in claim 1, wherein the second display electrode is disposed on the light transmitting area.

9. The display panel as claimed in claim 1, wherein the display panel further comprises a light guide structure disposed on the light transmitting area of the substrate.

10. A sensing display panel, comprising:
a substrate having a layout area and a light transmitting area located outside the layout area;
a display device disposed on the layout area of the substrate, and the display device comprising a first display electrode, a second display electrode, and a display media layer located between the first display electrode and the second display electrode;
a dielectric layer disposed on the substrate and cover the display device; and
a sensing device disposed on the layout area of the substrate and cover the dielectric layer, and the sensing device comprising a first sensing circuit, a second sensing circuit, and an insulating layer located between the first sensing circuit and the second sensing circuit, wherein the first sensing circuit and the second sensing circuit comprise a transflective electrode, and the first sensing circuit and the second sensing circuit are stacked on the display device to form an optical resonance structure, and the first sensing circuit overlaps with the second sensing circuit, wherein the optical resonance structure comprising a first transflective layer and a second transflective layer stacked on the display device and separated from each other, wherein the first transflective layer overlaps with the second transflective layer, and the first transflective layer of the optical resonance structure is the first sensing circuit of the sensing device, the second transflective layer of the optical resonance structure is the second sensing circuit of the sensing device.

11. The sensing display panel as claimed in claim 10, wherein the first display electrode and the second display electrode comprise at least one light transmitting electrode.

12. The sensing display panel as claimed in claim 10, wherein the second display electrode is disposed on the light transmitting area.

13. The sensing display panel as claimed in claim 10, wherein the sensing display panel further comprises a light guide structure disposed on the light transmitting area of the substrate.

14. A sensing display panel, comprising:
a substrate having a layout area and a light transmitting area located outside the layout area;
a display device disposed on the layout area of the substrate, and the display device comprising a first display electrode, a second display electrode, and a display media layer located between the first display electrode and the second display electrode;
a dielectric layer disposed on the substrate and cover the display device; and
a sensing device disposed on the layout area of the substrate and cover the dielectric layer, and the sensing device comprising a first sensing circuit and a second sensing circuit, wherein the first sensing circuit comprises a first transflective electrode, and the first transflective electrode of the first sensing circuit comprises a first sensing portion and a second sensing portion that are stacked on the display device to form an optical resonance structure, and the first sensing portion overlaps with the second sensing portion, wherein the optical resonance structure comprising a first transflective layer and a second transflective layer stacked on the display device and separated from each other, wherein the first transflective layer overlaps with the second transflective layer, and the first transflective layer of the optical resonance structure is the first sensing portion of the sensing device, the second transflective layer of the optical resonance structure is the second sensing portion of the sensing device.

15. The sensing display panel as claimed in claim 14, wherein the first sensing circuit further comprises a first light transmitting conductive layer disposed between the first sensing portion and the second sensing portion, and stacked on the display device.

16. The sensing display panel as claimed in claim 14, wherein the second sensing circuit comprises a second transflective electrode, and the second transflective electrode of the second sensing circuit comprises a third sensing portion and a fourth sensing portion that are stacked on the display device to form the optical resonance structure.

17. The sensing display panel as claimed in claim 16, wherein the second light transmitting sensing circuit further comprises a second light transmitting conductive layer disposed between the third sensing portion and the fourth sensing portion, and stacked on the display device.

18. The sensing display panel as claimed in claim 14, wherein the first display electrode and the second display electrode comprises at least one light transmitting electrode.

19. The sensing display panel as claimed in claim 14, wherein the second display electrode is disposed on the light transmitting area.

* * * * *

UNITED STATES PATENT AND TRADEMARK OFFICE
CERTIFICATE OF CORRECTION

PATENT NO. : 10,670,940 B2  
APPLICATION NO. : 15/796867  
DATED : June 2, 2020  
INVENTOR(S) : Chih-Chia Chang et al.

Page 1 of 1

It is certified that error appears in the above-identified patent and that said Letters Patent is hereby corrected as shown below:

On the Title Page

Item (30) Foreign Application Priority Data should read:  
Aug. 09, 2017 (TW).........................106126809 A Signed and Sealed this  
First Day of September, 2020

Andrei Iancu  
*Director of the United States Patent and Trademark Office*